United States Patent [19]

McCauley

[11] Patent Number: 5,363,318
[45] Date of Patent: Nov. 8, 1994

[54] METHOD AND APPARATUS FOR ADAPTIVE COLOR CHARACTERIZATION AND CALIBRATION

[75] Inventor: David K. McCauley, Henrietta, N.Y.

[73] Assignee: Eastman Kodak Company, Rochester, N.Y.

[21] Appl. No.: 855,280

[22] Filed: Mar. 23, 1992

[51] Int. Cl.$^5$ .......................... H04N 17/02; H04N 9/73
[52] U.S. Cl. .............................. 364/571.01; 364/526; 358/512; 358/519
[58] Field of Search ...................... 364/571.01, 571.02, 364/526; 358/10, 75, 80, 516, 519, 512

[56] References Cited

U.S. PATENT DOCUMENTS

| | | | |
|---|---|---|---|
| 4,254,432 | 3/1981 | Nakahata | 358/10 |
| 4,305,090 | 12/1981 | Hess et al. | 358/27 |
| 4,598,282 | 7/1986 | Pugsley | 340/703 |
| 4,667,228 | 5/1987 | Kawamura et al. | 358/80 |
| 4,688,079 | 8/1987 | Fendley | 258/10 |
| 4,694,330 | 9/1987 | Tanaka et al. | 358/27 |
| 4,700,218 | 10/1987 | Thomsen et al. | 358/29 |
| 4,706,108 | 11/1987 | Kumagai et al. | 358/10 |
| 4,736,241 | 4/1988 | Murakami et al. | 358/29 |
| 4,742,387 | 5/1988 | Oshima | 358/29 |
| 4,746,970 | 5/1988 | Hosokawa et al. | 358/29 |
| 4,814,858 | 3/1989 | Mochizuki et al. | 358/10 |
| 4,862,265 | 8/1989 | Bartow et al. | 358/139 |
| 4,939,581 | 7/1990 | Shalit | 358/244 |
| 4,962,418 | 10/1990 | Kamaga | 358/29 |
| 4,963,828 | 10/1990 | Kawame et al. | 358/10 X |
| 4,989,982 | 2/1991 | Osaki et al. | 364/526 X |
| 5,083,195 | 1/1992 | Evelin | 358/10 |
| 5,157,506 | 10/1992 | Hannah | 364/526 X |

FOREIGN PATENT DOCUMENTS 0198692 10/1986 European Pat. Off. ...... H04N 17/02
0313795  5/1989 European Pat. Off. ...... H04N 17/02

OTHER PUBLICATIONS

Supermatch Display Calibrator User's Manual, Oct. 1990, pp. 1–49.
Dunn Report Nov. 1990, vol. VIII, No. 11.
Newspapers & Technology article "Nikon, Savitar Ally for Color Calibration". Nov. 1990.
Computer Graphics World, Dec. 1990, p. 112.
Info World, Nov. 12, 1990, vol. 12, Issue 46, Developers, Users Seek Color Consistency.
Graphic Communications World, Oct. 15, 1990, "Nikon Licenses Savitar Spectral Plate Color Calibrator".
Precision Color Calibrator User's Manual, Jan. 1990.
Micro Publishing News, Oct. 1990, "Calibration Product Introduced for Color Scanners".
Seybold, vol. 20, No. 3, Oct. 8, 1990, "Color Calibration, Control and Communication: Savitar's Approach".
Rasterops Offers Unprecedented Color Accuracy With CorrectColor Management System, p. 12, Jan. 13, 1992.
Seybold, vol. 5, No. 10, Jun. 17, 1991, "RasterOps CorrectColor Calibrator", pp. 1–4.

(List continued on next page.)

Primary Examiner—Kevin J. Teska
Assistant Examiner—Eric W. Stamber
Attorney, Agent, or Firm—Thomas H. Close

[57] ABSTRACT

A system and a method in which channel independent linear transfer functions or calibration curves for color devices such as printers, scanners and displays are individually created. The calibration curves are created using a low cost light intensity sensor. Scaling constants are determined and desired linear aim response curves are scaled together to maintain a desired color balance. The color saturation effects are also removed by scaling or normalizing to some maximum input drive level that does not saturate any of the colors. The characterization curves are rotated about the desired linear aim response curves to create compensation curves for each the characterization curves adapted to the particular device response characteristics. The dynamic range maximized, linearized, color balanced and saturation compensation curves are loaded into conversion tables which convert input values into the appropriate output values.

20 Claims, 20 Drawing Sheets

OTHER PUBLICATIONS

The Press, Special Issue, Mar. 1991.
Color WYSIWGY Comes of Age, Advanced Graphics, Dec. 1990, pp. 275–279.
Dan Littman and Tom Moran, Macworld News, It's a Color Calibrator and a Floor Wax, p. 153, Jul. 1991.
R. S. Berns, M. E. Gorzynski, R. C. Motta, CRT Metrology and Colorimetric Characterization Techniques, Munsell Color Science Laboratory Technical Report, Sep. 1991.
SWOP, 1988 Edition, Color Separations and Film Preparation, pp. 16–17.
Colorimetry, Second Edition, 1986, pp. 29–32.

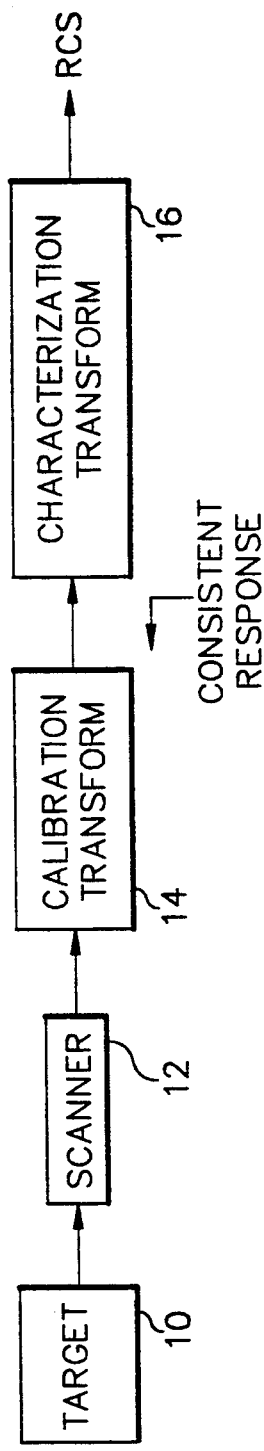
FIG. 1
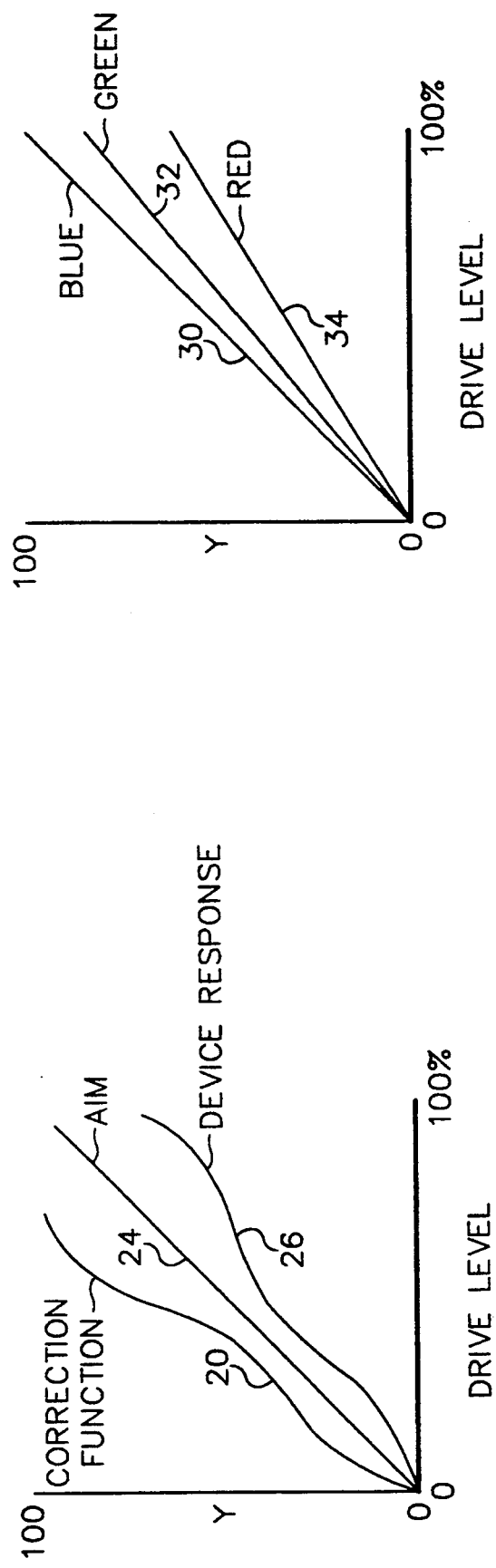
FIG. 3
FIG. 2

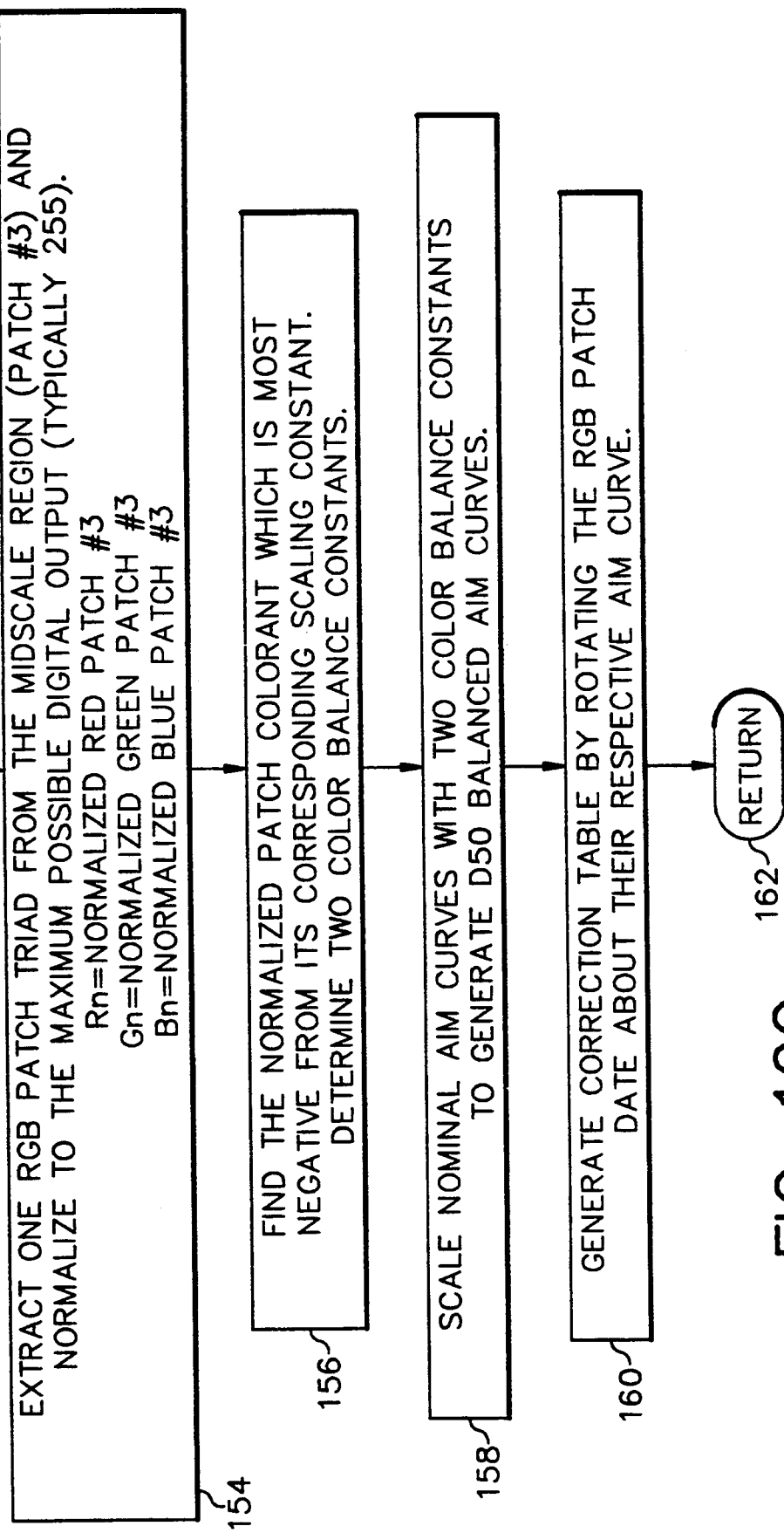

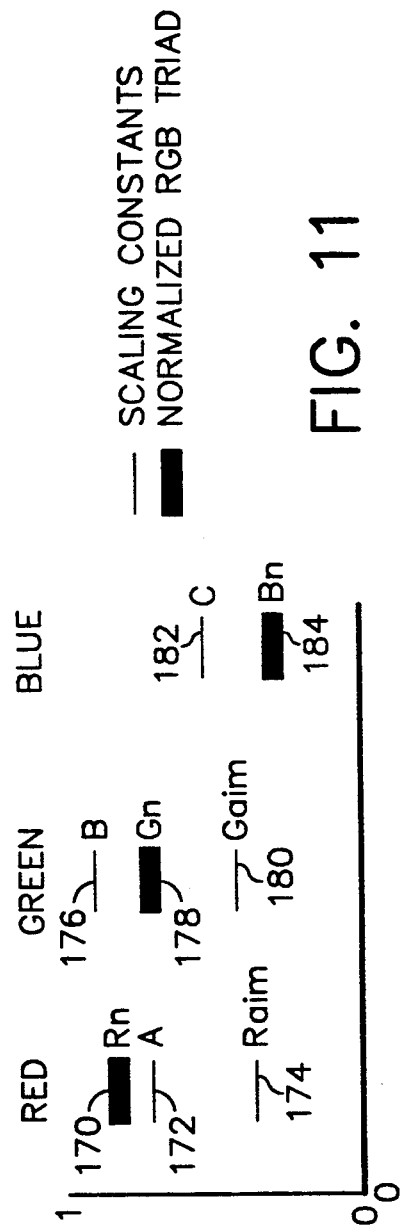
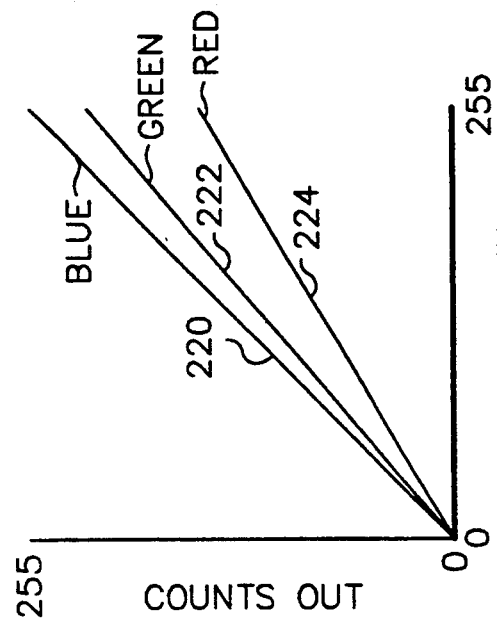
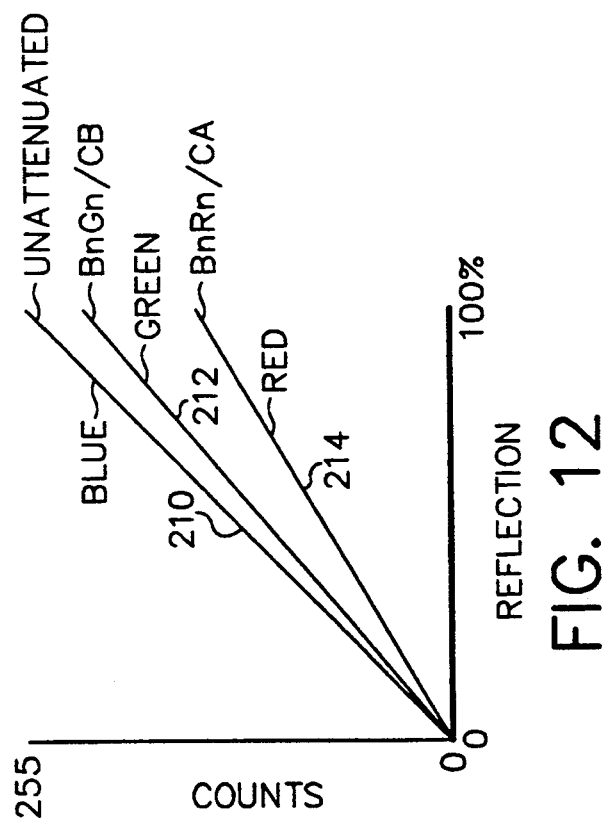
FIG. 11
FIG. 12
FIG. 13

FROM 284 (FIG. 16A)

↓

286 — EXTRACT ONE RGB PATCH TRIAD FROM THE MIDSCALE REGION AND NORMALIZE TO THE MAXIMUM POSSIBLE DIGITAL OUTPUT (TYPICALLY 255).
Rn=NORMALIZED RED PATCH #3
Gn=NORMALIZED GREEN PATCH #3
Bn=NORMALIZED BLUE PATCH #3

→

288 — FIND THE NORMALIZED PATCH COLORANT WHICH IS MOST NEGATIVE FROM ITS CORRESPONDING SCALING CONSTANT. DETERMINE TWO COLOR BALANCE CONSTANTS.

→

290 — SCALE NOMINAL AIM CURVES WITH TWO COLOR BALANCE CONSTANTS TO GENERATE D50 BALANCED AIM CURVES.

→

292 — GENERATE CORRECTION TABLE BY ROTATING THE RGB PATCH DATA ABOUT THEIR RESPECTIVE AIM CURVE.

→

294 — RETURN

FIG. 16B

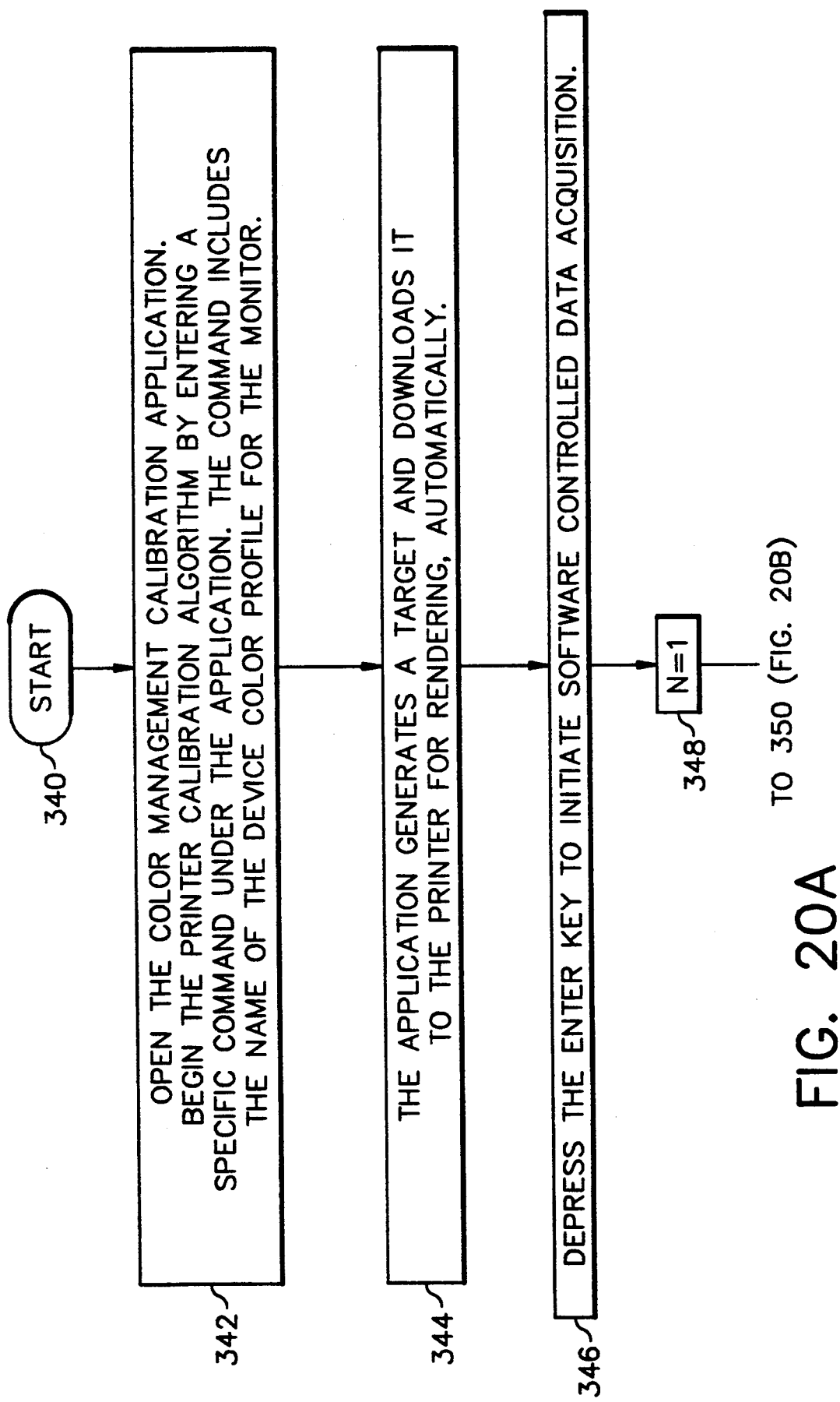

METHOD AND APPARATUS FOR ADAPTIVE COLOR CHARACTERIZATION AND CALIBRATION

CROSS REFERENCE TO RELATED APPLICATIONS

The present application is related to U.S. applications entitled Subtractive Measurement Method And Apparatus For CRT Output Intensity Measurement having U.S. Ser. No. 07/855,400 now U.S. Pat. No. 5,321,494 entitled Luminance Measurement Method And Apparatus having U.S. Ser. No. 07/855,281 now abandoned entitled CRT Calibrator Unit having U.S. Ser. No. 07/855,260 and entitled A Method And Apparatus For Automatically Calibrating A CRT Display having U.S. Ser. No. 07/785,980, all assigned to Eastman Kodak Co. and incorporated by reference herein.

BACKGROUND OF THE INVENTION

1. Field of the Invention

The present invention is directed to a method and apparatus for adaptively characterizing and calibrating color document scanners, color display units and color printers and, more particularly, the present invention is directed to providing-unique calibration transform for each device using a low cost achromatic sensor and where the calibration transform minimizes device population variance by providing a method, executable by the user of a color management system, producing constrained channel independent linearization, aim or target curve scaling to achieve a desired color balance and aim curve scaling for channel saturation correction.

2. Description of the Related Art

In desk top (low cost) color image processing or management systems which include peripheral devices, such as document scanners, color cathode ray tube monitors or displays and color printers, consistent color appearance matching between peripheral devices is necessary. Precise color rendering throughout such systems relies on the color stability, consistency and accuracy of the peripheral devices.

Calibration is an integral part of a low cost color management system. Numerous manufacturers market devices and/or software packages which addresses the peripheral calibration requirement with various levels of calibration accuracy. A majority of these solutions are limited to monochrome calibration for cost reasons, and thus are not as accurate as those products incorporating full colorimetric measurement and correction. It is generally though erroneously felt that monochrome calibration is sufficient for the desk top environment.

For scanner calibration, Savitar, markets two solutions aimed at the high and low end markets. The high-end solution, sold under the name SpectraPlate/35, utilizes a numerical analysis package in conjunction with a target containing a linear variable spectral filter and a neutral density gray ramp. The neutral density ramp is used to measure and correct tone scale deficiencies. This ramp exhibits constant transmission characteristics across the visible spectrum and varies linearly by two orders of magnitude in transmission from D-min to D-max. The linear variable filter is utilized to balance the scanner's red, green and blue (RGB) channels to neutral gray across the entire dynamic range of the device. It functions as an interference wedge that spectrally separates the scanner's illumination system into a continuous distribution (in a manner similar to a prism) which is then imaged onto a charge coupled device (CCD) imager. Fiducial marks on the target permits correlation of pixel data to wavelength. This enables the scanner to obtain its spectral response without external instrumentation. Savitar's low end product, ScanMatch, utilizes a 24 patch colorimetric target as a reference, thus enabling accurate colorimetric calibration with in target tolerance. Under this approach, the target is scanned by the device to be calibrated using either the ScanMatch application or some other program containing the appropriate device drivers. The resulting digital data file is processed by the ScanMatch application where data extraction and transform generation occurs. Transform table construction is simply performed by building a model linking scanned data to previously defined reference data that was derived from the target.

Vendors such as RasterOps, Radius, SuperMac and Barco market closed-looped monitor calibration packages which include various combinations of instrumentation (typically a colorimeter), signal correction electronics and control software for automated data acquisition and numerical analysis. Those systems contain or are capable of supporting colorimeters to provide color balance calibration by modifying look-up tables or a color correction matrix. Colorimetric calibration yields optimal results, but is excessively cost prohibitive, therefore, is usually instituted on high end systems. Those packages that do not support this calibration assume a nominal phosphor characteristic in their correction matrix.

The Radius and SuperMac Technology's SuperMatch products provide a low end solution limited to monochrome calibration. Both packages, which are essentially similar, contain a control and numerical analysis application and a measurement device for gun response measurements. These two solutions generate numerous test patches along the primary scales which are subsequently measured to ascertain the independent gun response. A look-up table for each gun is calculated which appropriately distorts incoming data to overcome channel irregularities to form some predetermined, idealized response. This process is generally referred to as "gamma" correction since it negates the monitor's characteristic gamma response, but the proper idealized response could help overcome systems problems such as flair, surround effect, etc. Both products also permit user selection of monitor white point which is accomplished by selecting the desired correlated color temperature and monitor type. Prestored phosphor chromaticity data for each monitor type is utilized to adjust the gamma correction curves to achieve the desired color balance. Obviously, this colorimetric calibration method is inferior when compared to others since device measurements are not performed on each device, instead they are made at the factory on a limited population.

If more exacting colorimetric calibration is required, each device must be measured independently using a colorimeter or spectralradiometer. The RasterOps CorrectColor Calibrator product serves this market by providing an integrated colorimeter with a supporting control/numerical analysis software package. This system supports user defined gamma correction and color temperature adjustments as outlined above, but uses measured phosphor chromaticity values rather than a factory standard default. The overall colorimetric calibration accuracy is then limited by measurement precision.

Printer calibration also utilizes a measurement device (usually a densitometer, colorimeter with a source or a spectrophotometer) and a software package to perform data generation and numerical analysis. The typical calibration procedure includes printing a standardized target containing tone and/or gray scales followed by patch measurement and data insertion into the software (usually automated). Some systems utilize visual matching methods in place of instrumentation which undoubtedly causes higher levels of measurement error as compared with other forms of instrumentation. Numerical analysis is then performed to generate channel independent look-up tables which correct for non-idealized printing characteristics. The exact target characteristic response is a function of the package and is defined linearly with respect to dot gain or in terms of a D-log E curve. This procedure is followed on both 3 and 4 color printers. The 4 color or "black" printer presents a special problem since the manufacturer has optimized the printing process by adding a black component in place of varying amounts of CMY (Cyan, Magenta, Yellow). These UCR (Under Color Removal) and GCR (Gray Component Replacement) algorithms are generally different for each device type and are considered proprietary knowledge of the print engine manufacturer. This information is not readily disseminated which forces the calibration system to compromise for a particular device to support all such devices.

Attempts to market low-end printer calibration tools have been limited at this point because of instrumentation cost and the recent emergence of consumer grade color printers. A need for higher accuracy rendering is just starting to emerge, thus product development efforts have not matured. Eastman Kodak Co. currently sells a calibration package to linearize a QMS (Color Script 100) printer from densitometer measurements of the tone and gray scales.

SUMMARY OF THE INVENTION

It is an object of the present invention to provide a calibration method which minimizes device population variance.

It is another object of the present invention to characterize and calibrate devices in different classes, such as scanners, printers and displays, using the same method.

It is also an object of the present invention to calibrate to a desired aim or target curve.

It is still another object of the present invention to provide a calibration system that uses a low cost achromatic photometer light sensor that senses intensity and is nonphotopic.

It is a further object of the present invention to provide a transform that is universally applicable to devices in the same class.

It is an object of the present invention to provide a system that simultaneously corrects for saturation effects, linearizes device response, balances color response and scales device response to utilize the entire dynamic range of the device.

It is an additional object of the present invention to provide a system that independently corrects the color channels by providing independent color correction curves which together are constrained to provide a color balanced response.

It is a still further object of the present invention to provide a calibration system that can be periodically used by the user of a color reproduction system at the users job site after the color reproduction system has left the factory.

The above objects can be attained by a system and a method in which channel independent linear functions for device classes, such as printers, scanners and displays, are created to compensate for undesired tone scale behavior by requiring that the aim or target tone scale curves track or move together. A light intensity sensor is used to separately measure color response curves. The curves are linearized separately and scaled together to maintain a desired color balance. The color saturation effects are also removed by scaling to some maximum input drive level that does not saturate any of the colors and which maximizes the dynamic range. The scaled, linearized, color balance and saturation compensation curves for each color are loaded into a conversion table which converts input into the appropriate output values for the device class.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates the transforms created by the present invention;

FIG. 2 illustrates a correction operation;

FIG. 3 depicts color balanced aim or target curves;

FIGS. 10A, 10B and 10C depict the process performed by the computer;

FIG. 11 depicts balance operations;

FIG. 12 depicts balanced aim curves;

FIG. 13 illustrates a correction table in graphic form;

FIGS. 16A and 16B comprise a flowchart of a computer process for monitor calibration;

FIGS. 20A and 20B depict a printer calibration process;

DESCRIPTION OF THE PREFERRED EMBODIMENTS

Figure 5:
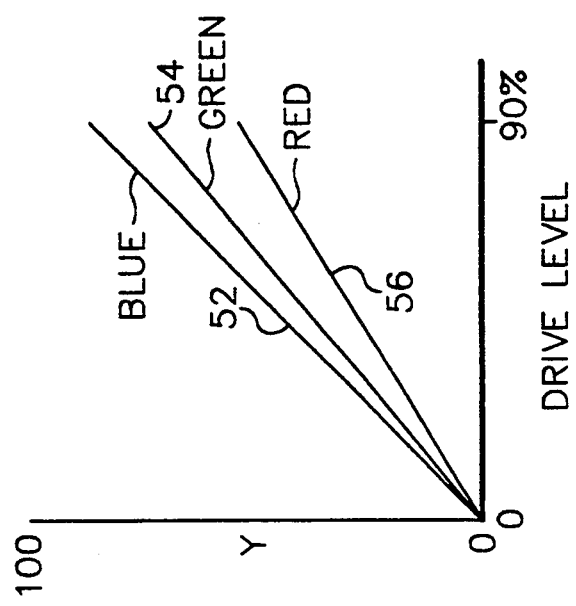
FIG. 5 illustrates rescaled balanced aim curves corrected for saturation.

The present invention provides a calibration apparatus and method that minimizes device population variance when each device is individually calibrated by a user either at the factory or at the job site, This invention yields a unique calibration transform for each device that causes each device in a population to appear identical when digital data is passed through the transform. As an example, a scanned test target 10 scanned by a scanner 12 should generate identical responses through a calibration transform 14 and a characterization transform 16 for all devices within a design tolerance, as illustrated in FIG. 1. A set of transforms permits creation of a single statistically mean transform for each color that may be universally applied to all devices of a specified type (such as scanners).

To guarantee consistent response at the calibration/characterization transform interface 14 and 16, adaptive channel interdependent linearization is incorporated into the calibration process. Four key concepts are utilized concurrently in the present invention to incorporate such linearization: (1) constrained channel independent linearization, (2) aim or target curve scaling to achieve a specified color balance, (3) aim curve scaling to remove channel saturation effects and (4) aim curve scaling to utilize the entire dynamic range of the device.

Channel independent linearization is a technique similar to "gamma" correction for monitors where correction functions are constructed to compensate for undesired tone scale behavior. The desired or target response is referred to as an "aim" curve and is defined in terms of device drive values to some traceable reference color space metric, such as CIE (Commission Internationale de l'Edairage) XYZ (tristimulus values) or $L^*A^*B^*$. In the general case, this relationship is a linear function, hence the origin of the term "linearization," but it may take on other forms which serve to minimize system quantization errors. As illustrated in FIG. 2 for a device, a correction function 20 may be derived by simply rotating the actual device response about the aim curve when a linear response curve 24 is desired creating a mirror image of the response on the opposite side of the aim curve as shown, a task within the skill of those of ordinary skill. Non-linear aim curves require a more sophisticated evaluation method involving device modeling or point-by-point evaluation such as that described in the related U.S. Application entitled A Method And Apparatus For Automatically Calibrating A CRT Display having U.S. Ser. No. 07/785,980 previously mentioned. Both of the above mentioned methods, when used as described herein, transform the responses using aim curves and a balanced white point.

The aim curve preferred for color management use is infinitely scaleable to permit utilization of full device dynamic range. Fixed aims are useful in some circumstances, but the typical computer peripheral has a limited dynamic range to begin with, so that even slight range compression could cause noticeable image contouring. Due to system requirements, the linearization metric needs to be a CIE traceable color space that operates on appropriately scaled data. FIG. 3 illustrates cap Y from CIE tristimulus space for curves 30, 32 and 34 defined as a linearization metric which is scaled to a white point by definition, thus meets the desired criteria. CIE $L^*A^*B^*$ or $L^*U^*V^*$ spaces are also usable spaces since they are also scaled to a white point.

Normally, one aim is applied to all 3 or 4 device colorants simultaneously. This approach is generally sufficient for a fixed aim assuming the maximum device response exceeds the maximum aim requirements. Variable aims do not preserve a specific color balance and this is not acceptable. Full channel independence does not guarantee a known relationship between the colorants, and thus is not capable of compensating for degradations of a single colorant. For example, this effect occurs quite frequently in monitors where emissivity of one gun falls with time which causes a color balance shift while preserving a relative tone scale.

This problem may be overcome by appropriately constraining channel independent linearization such that the relative tone scales track. The preferred method involves scaling the 3 or 4 aims appropriately to achieve some sort of known color balance. The actual white point aim is not important in the general case provided it is achievable, robust and does not impact overall system accuracy. The color balance used by the present invention is preferably defined as a neutral gray under a D50 illuminant.

Aim scaling is performed by utilizing an ideal additive (scanners and monitors) or subtractive (printers) color model as appropriate. A linear combination of the primaries can be found in either color system which satisfies the balance requirement given the knowledge of each primary's spectral characteristics. This function defines the required ratio of primaries across the entire gray scale which yields a true neutral to an excellent approximation for additive devices. Certain classes of printers, however, do not exactly adhere to the linear subtractive model due to ink laydown effects which cause some slight hue shading down the neutral scale. This effect is negated by the subsequent characterization step since a model is built of the calibration transform/device cascade and thus may be ignored.

Figure 4:
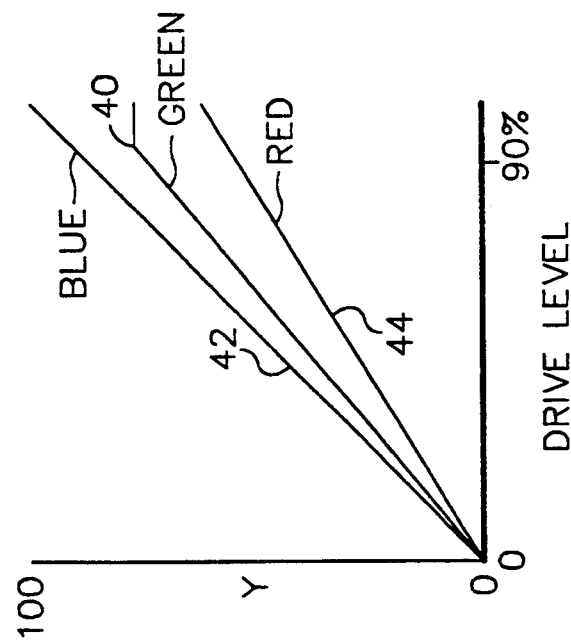
FIG. 4 illustrates a saturated green primary.

Since device to device variations exist in terms of dynamic range, minimum and maximum values, the concept of aim curve scaling may be applied to overcome these defects. Those regions where the linearization results depart from the aim are eliminated and scaling is applied to utilize the remaining device dynamic range. This situation commonly occurs on scanners and monitors when channel saturation is achieved and on printers as a particular colorant's maximum density degrades with time. FIG. 4 gives a graphic example of a green primary 40 saturated at 90% full scale while the full scale is available for blue 42 and red 44. A rescaled color balanced aim as illustrated in FIG. 5 has a maximum input drive level of 90% full scale on all channels. As illustrated, the red 56 and blue 52 aims have been truncated at their former 90% point matching the maximum saturation of the green aim 54 and which preserves neutrals at the cost of dynamic range. The ordinate has been rescaled such that 100% Y corresponds to blue at 90% rather than 100% and the balanced relationship of FIG. 3 has been maintained.

Figure 6:
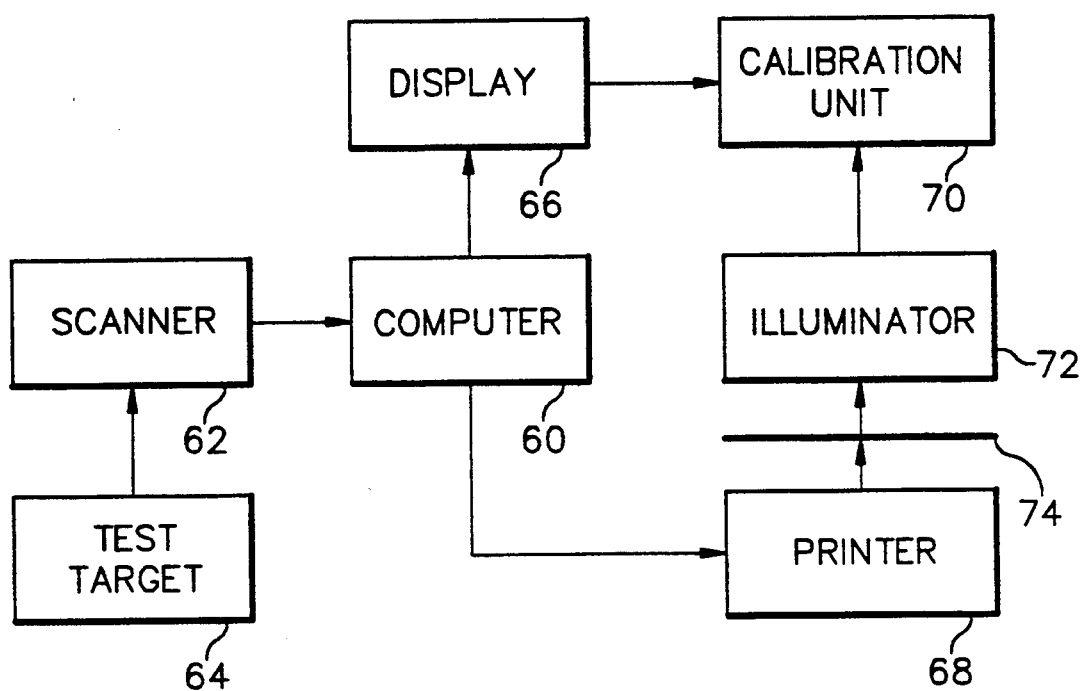
FIG. 6 illustrates the components of a system in accordance with the present invention.

A typical system in accordance with the present invention, as illustrated in FIG. 6, includes a computer 60, such as an IBM personal computer/system or an Apple Macintosh computer. The computer 60 can receive scanned documents from a scanner 62, such as 600ZS ScanMaker available from Microtek Lab, Inc. of Torrence, Calif. To calibrate the scanner a predetermined test target document 64 is scanned. The output devices include a display 66, such as a CRT display or a liquid crystal display which typically comes with the computer 60, such as an Apple Macintosh, and a printer 68, such as the XL7700 Dye Sublimation Printer available from Eastman Kodak Co. of Rochester, N.Y. The display 66 is calibrated using a calibration unit 70 which includes a low cost light intensity or achromatic sensor such as described in the related U.S. Application entitled CRT Calibration Unit having U.S. Ser. No. 07/855,260 using processes described in the related U.S. Application entitled Subtractive Measurement Method And Apparatus For CRT Output Intensity Measurement having U.S. Ser. No. 07/855,400 and U.S. application entitled Luminance Measurement Method And Apparatus having U.S. Ser. No. 07/855,281 previously mentioned which provide light intensity data for performing the processes of the present invention. The printer 68 is calibrated using the calibration unit 70 as a reflectometer by combining the unit 70 with an illuminator 72 illuminating a printed document 74 with a stable light source and an aperture/lens through which the unit 70 looks. The results produced by the present invention are preferably stored in a set of characterization and calibration tables, one table for each color, which can be part of a file that can be loaded into the computer 60 depending upon the application (scanning, displaying or printing) being performed.

Figure 7:
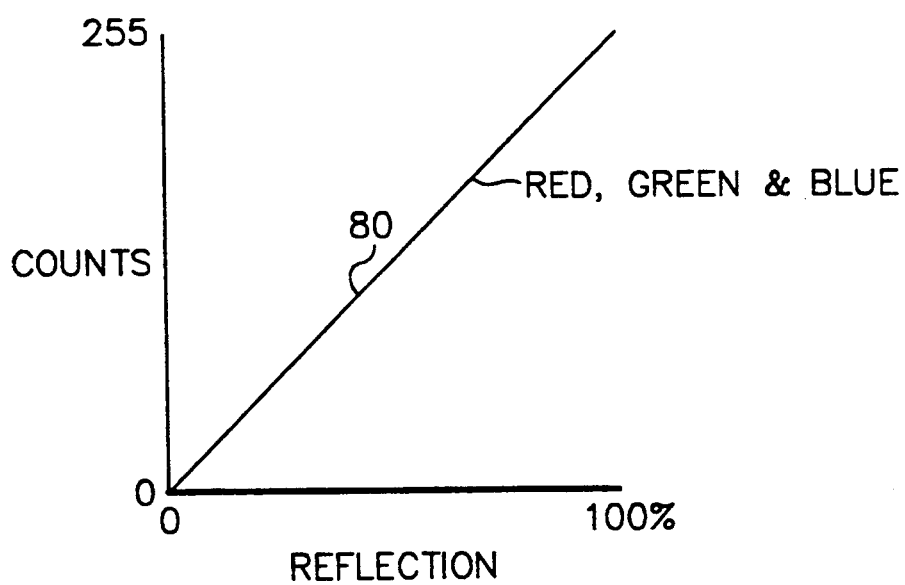
FIG. 7 illustrates a combined, tricolor aim curve for a scanner.

Adaptive aim curve calibration for a scanner 62 is a simple case since most devices exhibit linear additive characteristics as illustrated in FIG. 7 by the combined curve 80. The appropriate ratios of red, green and blue (RGB) required to achieve a true neutral gray at minimum densities (reflection or transmission) also holds at maximum densities; therefor, only one point on the tone curves must be examined. The scales of the axes used in describing the response of a device in this description are denominated in "counts" which represents the digital value needed to provide the desired output. In the example of FIG. 7 a reflectance from a document of 100% will produce an output by the scanner of 255 while a zero reflectance will produce a 0 output by the scanner.

The effective tristimulus value of a scanned patch under a given illuminant is given by the convolution:

$$X = k_x \int P(\lambda)p(\lambda)r(\lambda)x(\lambda)l(\lambda)d\lambda \quad (1)$$

$$Y = k_y \int P(\lambda)p(\lambda)g(\lambda)y(\lambda)l(\lambda)d\lambda \quad (2)$$

$$Z = k_z \int P(\lambda)p(\lambda)b(\lambda)z(\lambda)l(\lambda)d\lambda \quad (3)$$

where $p(\lambda)$ is the spectral reflectance of the patch being scanned, $P(\lambda)$ is the scanning illuminant spectral power distribution plus imager response to a 100% diffuse reflector, $l(\lambda)$ is a reference source spectral power distribution, preferably D50, $r(\lambda)$, $g(\lambda)$, $b(\lambda)$ are the filter's spectral sensitivities, $x(\lambda),y(\lambda)$, $z(\lambda)$ are the 1931 CIE Color Matching Functions and $k_x$, $k_y$, $k_z$ are normalizing constants defined by:

$$k_x = \frac{1}{\int P(\lambda)r(\lambda)d\lambda} \quad (4)$$

$$k_y = \frac{1}{\int P(\lambda)g(\lambda)d\lambda} \quad (5)$$

$$k_z = \frac{1}{\int P(\lambda)b(\lambda)d\lambda} \quad (6)$$

Given that a neutral gray patch of a particular target material has specific tristimulus values under the D50 illuminant: $X_{D50}=k_1$, $Y_{D50}=k_2$, $Z_{D50}=k_3$, where $k_1$, $k_2$ and $k_3$ will vary depending on the paper used since each type of paper will have a different XYZ for white under the D50 illuminant. It is a simple matter to find three scaling constants such that: $X_{D50}=C_1X$, $Y_{D50}=C_2Y$ and $Z_{D50}=C_3Z$ where $C_1$, $C_2$ and $C_3$ are unnormalized scaling constants. Since we are dealing with relative colorimetry, these may be scaled by dividing each by the largest values of the triad using: $A=C_1/\max(C_1,C_2,C_3)$, $B=C_2/\max(C_1,C_2,C_3)$ and $C=C_3/\max(C_1,C_2,C_3)$ where A, B and C are normalized color balanced scaling constants. These color balanced scaling constants are preferably stored in a header file associated with each transform.

Figure 8:
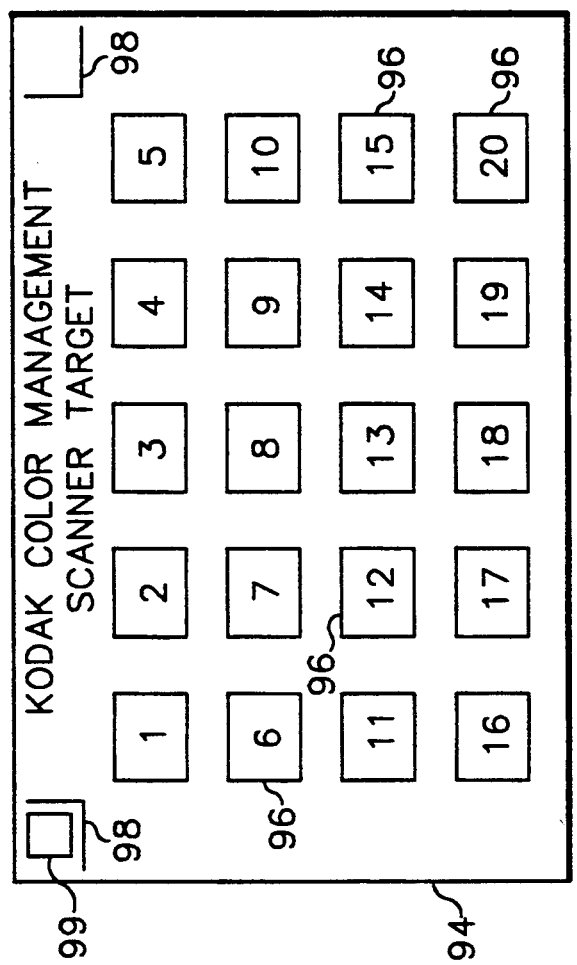
FIG. 8 depicts a scanner target.

The scanner calibration procedure uses a calibration target 94 as illustrated in FIG. 8. The preferred target 94 includes several (20) color patches 96 with patch density values which range from 0.05D to 1.95D, Status A Density, D50 illuminant. The test target 94 also includes fiducial marks 98 for orientation and a position location patch 99. The target is a monochrome (black and white) target and is used for all three scanner channels simultaneously. The scanner will separate the target into three different color targets via the scanning process. Several conventional printing technologies exist which can be used to satisfy target requirements including photographic replication, halftone printing and spot color printing. Each printing technique has both positive and negative characteristics such as manufacturing cost, target durability, replication tolerance and production volumes which each weigh heavily in the selection decision. For the highest possible calibration accuracy, the target should be fabricated on the same paper stock that the material to be scanned is printed on. Otherwise, any of the above mentioned printing technologies may be utilized successfully, but the optimal choice is the one most cost effective within specification constraints. Overall calibration accuracy is largely dependent on accurate knowledge of target patch characteristics. Two philosophies exist which address this concern. The first is to print highly precise targets and store the nominal patch values in the calibration software. The other is to print low precision targets, measure each target or perhaps each batch and then ship actual patch values with each target. Manufacturing studies have shown that printing high precision targets is the most cost effective production method; therefore, this is the preferred method selected for implementation.

Figure 9A:
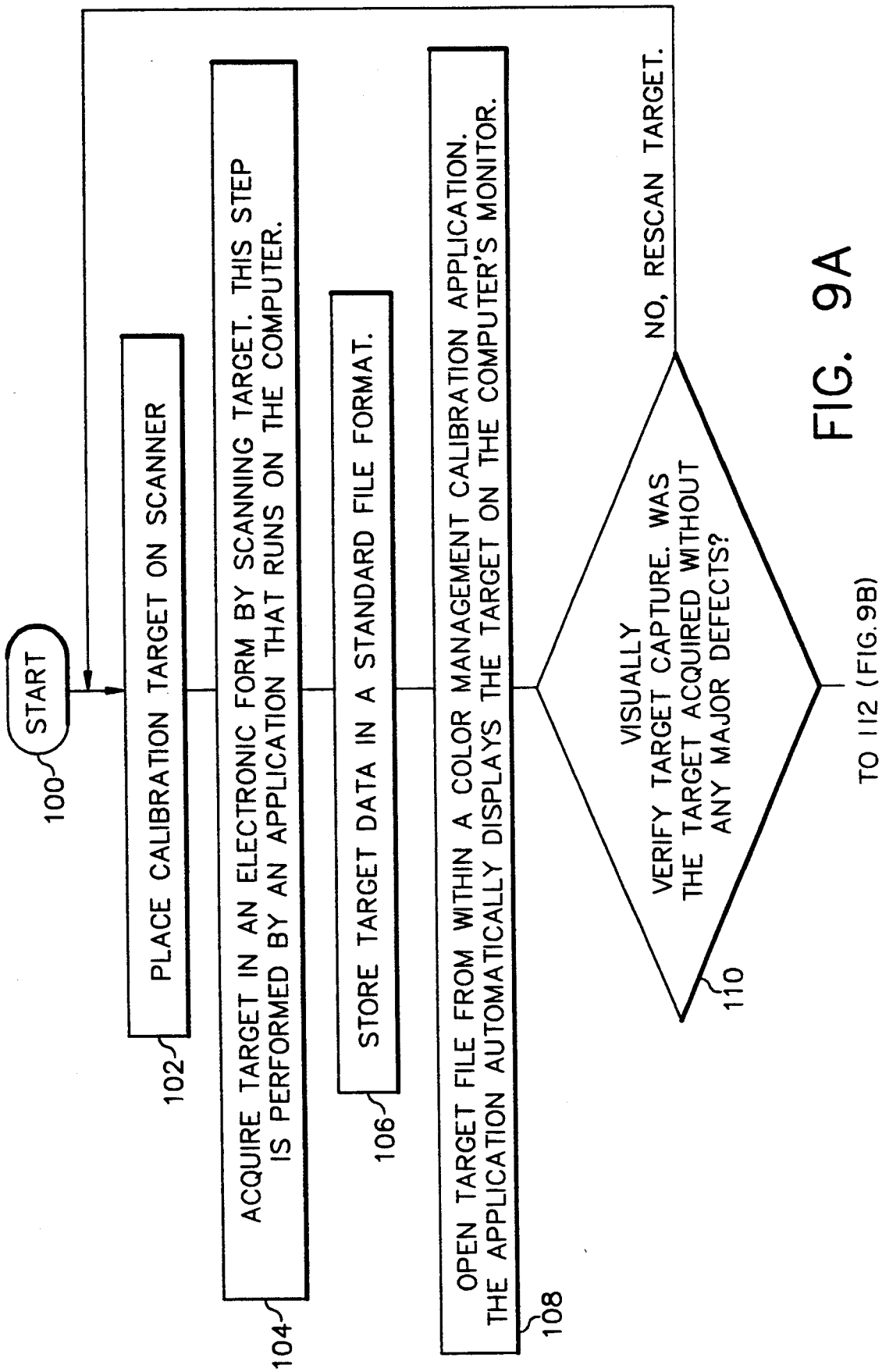
FIGS. 9A and 9B comprise a flowchart of the scanner calibration process.

After the target is placed 102 on the scanner 62 by the user, as illustrated in FIG. 9A, the next step in the calibration procedure is to acquire 104 the calibration target electronically after being scanned by the device to be calibrated. This is executed by placing a target as illustrated in FIG. 8 on the scanner's platen followed by invoking an acquisition sequence. Most scanners, including the preferred scanner, have included with the hardware a conventional application which performs automatic device control, data acquisition and storage tasks after a particular command is entered in the computer 60. The resulting color digital data is stored 106 in a target file in a standard bit-mapped oriented file format-such as TIFF, PICT or EPS—in order for data extraction to occur.

The target file is then opened 108 from within a color management calibration application or routine which automatically renders the scanned version of the target on the computer's monitor. The rendered version is rendered in calibrated form using the method for displays to be described later herein. Visual verification 110 is performed to check for gross errors in the acquisition process. Major defects such as missing pixels, excessive flair or inadvertent target cropping should be easily noticed by even novice users which must result in a rescan since the data is too contaminated to utilize.

Target orientation is checked 112 (See FIG. 9B) next by noting the location of the position locating patch. This patch should be located at the top, left-hand corner of the rendered image when all text is directly readable. Conventional image rotation tools can be used to orient 114 the image correctly. These tools are available in most drawing packages and some scanner control applications. Image resizing may be required if the resolution is too high. Ideally, the image should be scanned in at 100 to 150 dots per inch (DPI) for the patches to be of sufficient size for the extraction process. Conventional tools to perform image resizing are also available in most drawing packages, however, care must be applied in selecting an interpolation technique. Multi-pixel algorithms, such as bi-linear or bi-cubic interpolation, tend to yield erroneous results due to curve fitting errors and should be avoided. A nearest neighbor interpolator gives excellent results and is preferred. The file is then stored in bit-map form for subsequent processing and then closed 116.

Figure 9B:
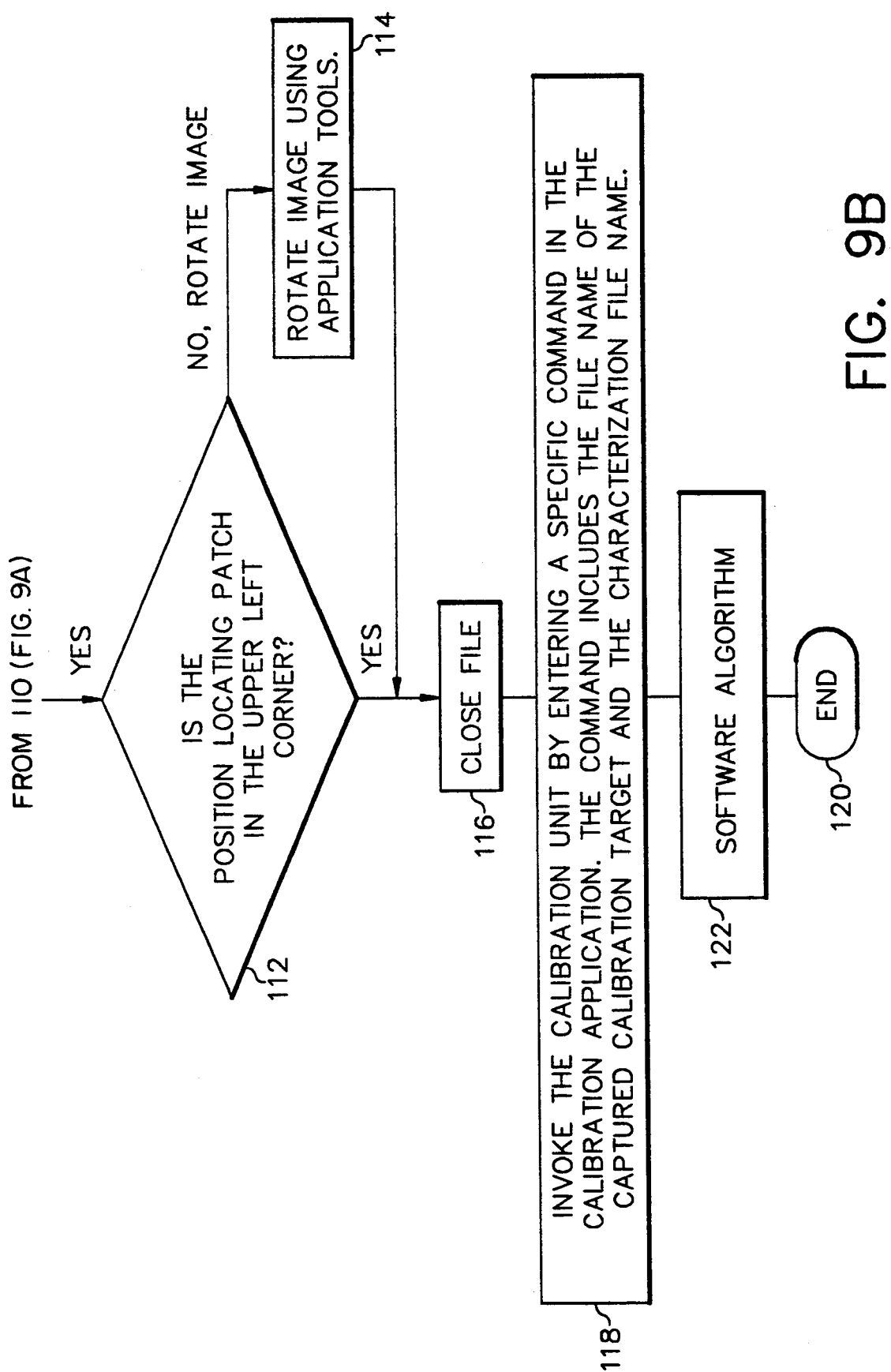
Figure 10A:
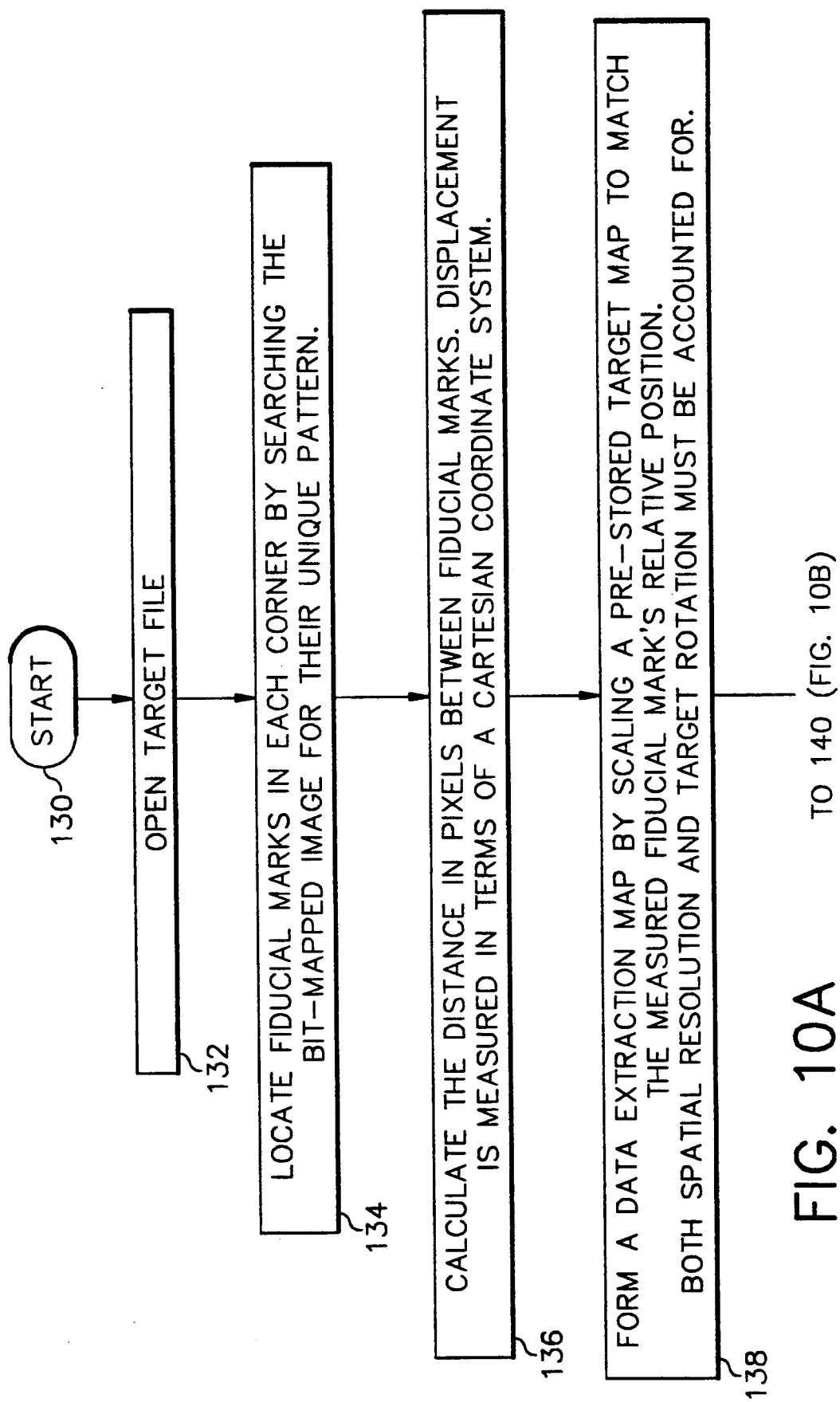
Figure 10B:
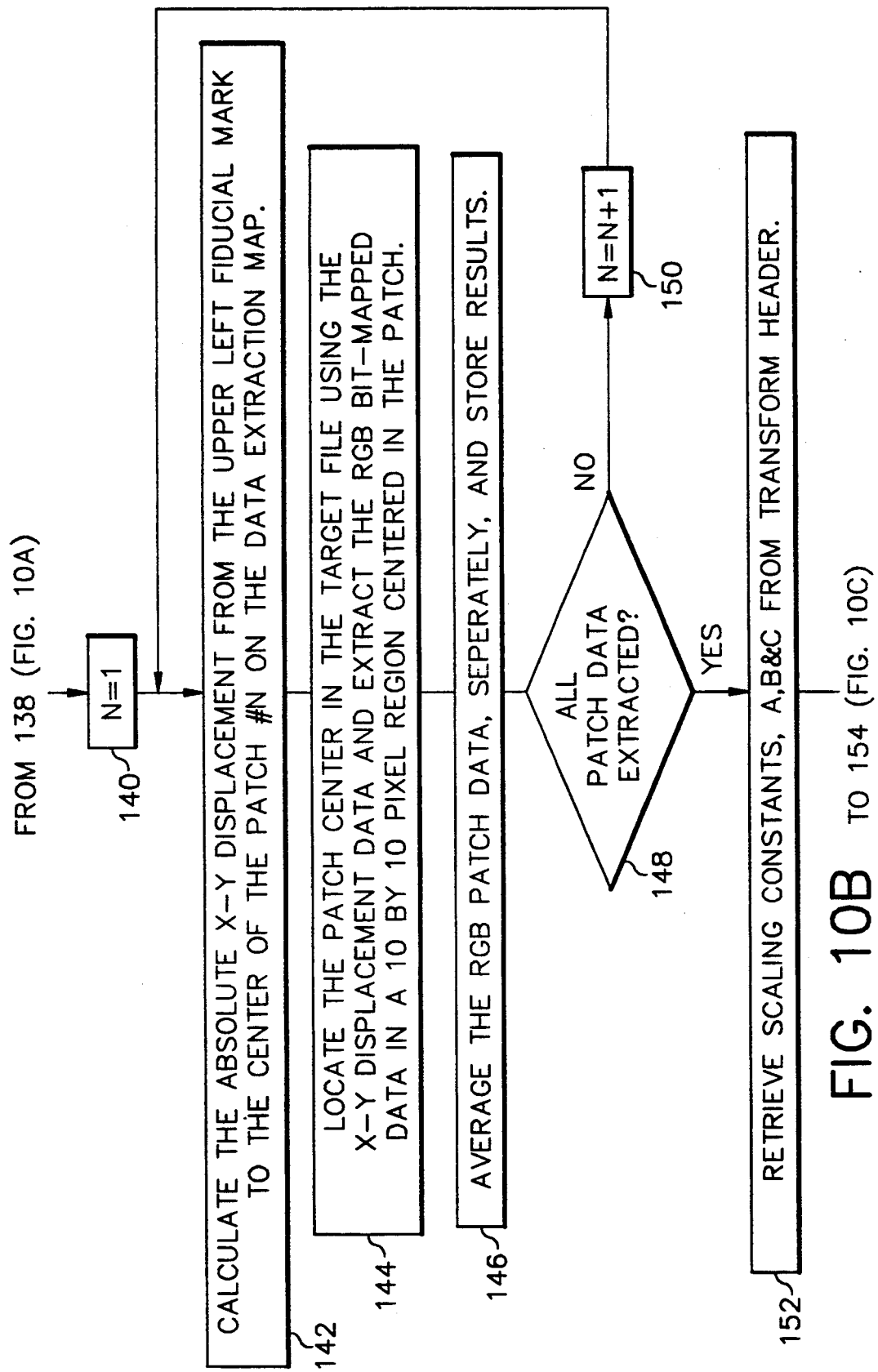

A calibration process is then invoked 118, as illustrated in FIGS. 9A and 9B, through a user entered command from within the application. Command attributes include the file name of the visually validated calibration target and the file name of the patch values corresponding to the scanner device being calibrated. The software algorithm for calibration processing is then performed 122 as illustrated in FIGS. 10A, 10B and 10C.

In the first step in the calibration process the target file is opened 132 (FIG. 10A) in a full frame buffer located within the calibration application. A subsampled version of the image may be optionally displayed on the monitor for file verification purposes, but is not required.

Fiducial marks locations are determined 134 by scanning the bit-mapped data for their unique "V" shaped pattern. Once each point is accurately located, the relative displacement between them is calculated 136 in terms of delta X and delta Y on a Cartesian Coordinate system. This information is used to conventionally scale 138 a pre-stored target map, so that the spatial resolution and rotation of the map matches that of the scanned target. A patch counter is then initialized 140 (FIG. 10B).

The map pinpoints 142 each patch center in absolute displacement from the two fiducial marks. Data extraction sequentially occurs on a patch by patch basis by examining 144 a 10 by 10 pixel region about each center point of each patch as defined by the target map. Each 100 pixel group is averaged 146 and the Root Mean Square (RMS) error is calculated from that average. The RGB averages are temporarily stored while the RMS error is checked against a maximum threshold. Exceeding the threshold indicates either excessive scanner noise or inappropriate target resolution has occurred. A user warning is preferably posted to alert the user of the situation. Target re-acquisition is advised, but not necessary. The patch counter is tested 148 and incremented as necessary until all patch data has been extracted and averaged.

The scaling constants previously discussed are then retrieved 152 from the transform header file and are used as a reference in the color balance calculations. As illustrated in FIG. 11, the most negative normalized RGB value 184 for a midscale patch as measured 154 (FIG. 10C) from its scaling constant becomes 156 the fixed data point from which all subsequent calculations are made. It is important to note that in a conventional normalization operation the maximum coupled value is scaled to the maximum scale value and other values are scaled proportionately. That is, the normalized RGB triad calculated R at 255, G at 255 and B at 255 and scaled to unity. The reason that the values here are not at one is because a midscale triad whose values are less than one by definition has been chosen as the point for scaling the entire curve. Step 154 removes the channel saturation effects and maximizes aim curve scaling for full dynamic range. If one channel prematurely saturates, the normalized data value at the saturation point is used instead of the maximum patch value. This substitution removes the channel saturation effects which would show up as nonachromatic highlights in a scanned image. The overall attenuation is calculated from the ratio of Bn and C. The overall attenuation is a scaling factor applied to two of the three scaling constants to generate new scaled aim curves. The overall attenuation is applied to the remaining two scaling constants, A and B yielding Raim and Gaim, in this example. An attenuation factor is then calculated 158 which brings the normalized red and green channel down to their respective aim values where Overall Attenuation=Bn/C, Baim=$B_n$, Gaim=GnBn/C, Raim=RnBn/C, Green Attenuation=(Gn/B)*Overall Attenuation and Red Attenuation=(Rn/A)*Overall Attenuation. Applying these scaling factors to or multiplying the unbalanced aim curves by these scaling factors yields the color balanced aim curves illustrated in FIG. 12. Note that the blue channel 210 is left unattenuated while the two remaining channels 212 and 214 are appropriately scaled. Correction table creation is performed 160 by simply rotating the extracted patch or characterization data for each color about their respective aim curves and conventionally interpolating between the points providing channel independent linearization. The related application on automatic calibration shows the rotating operation. Tables as illustrated graphically by the curves 220, 222 and 224 in FIG. 13 result. These curves 220, 222 and 224 are the transforms which simultaneously accomplish the four objectives previously discussed. During use digital values for the color of each pixel in an image produced by the scanner (counts in) are transformed into corrected digital values (counts out) using a conventional table look up operation.

Monitor 66 calibration closely follows the procedure set forth above for input devices since pertinent device behavior parallels those of the flatbed scanner 62. This device class also may be represented by an additive model to an excellent approximation, but the primary responses are not linear with excitation as it was with the scanners. The gun transfer functions between the video signals and the electron beams are conventionally modeled as:

$$R = k_{1r} \frac{\text{Drive Value}}{\text{Maximum Counts} + k_{2r}} \gamma_r \quad (7)$$

$$G = k_{1g} \frac{\text{Drive Value}}{\text{Maximum Counts} + k_{2g}} \gamma_g \quad (8)$$

$$B = k_{1b} \frac{\text{Drive Value}}{\text{Maximum Counts} + k_{2b}} \gamma_b \quad (9)$$

where all k and γ terms are constants and drive value falls between 0 and maximum counts.

Figure 14:
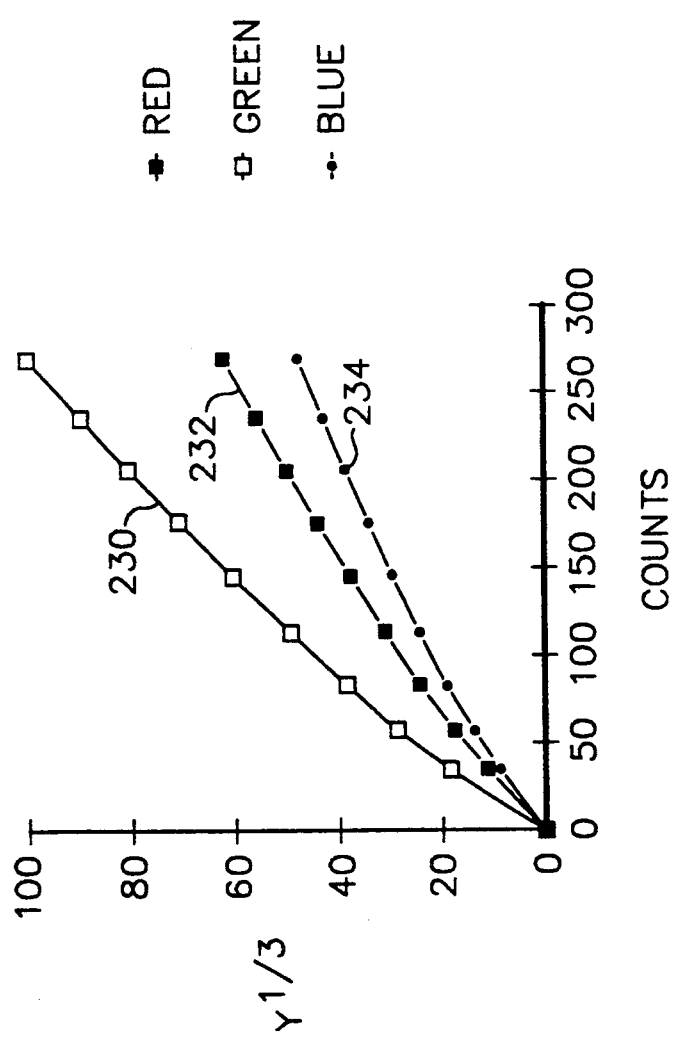
FIG. 14 depicts monitor characteristics.

As illustrated in FIG. 14, the typical monitor exhibits a distinct power function as predicted by the gun transfer function above when each primary's response is measured independently with a photometer. In FIG. 14 the vertical axis represents the cubic root of luminance (Cap Y). The curves 230, 232 and 234 are generated by measuring the luminance of each channel independently as a function of counts, preferably as described in the subtractive measurement application previously mentioned, and plotting $Y^{1/3}$ as a function of counts. Note that for reasons to be discussed shortly, the ordinate is not a linear function, but rather a cubic root function. This causes the apparent Γ to be less than one when in reality, $\gamma \cong 2.2$. These functions model the most unstable portion of a practical device which tends to drift with time and temperature. Since this phenomenon is not gun interdependent, it may be corrected using the variable aim curve approach discussed herein.

The remaining portion of the classic monitor model is given by a conventional 3 by 3 matrix which simply performs a "rotation" between the RGB gun responses above and measurable tristimulus values, that is, equation 10 below is the transfer function from the electron beam collision with the monitor phosphors the measured tristimulus values. This matrix is strictly a linear combination of constants which corresponds to RGB to XYZ conversion combined with a color crosstalk matrix which does not affect channel linearity. The physical interpretation of the cross-talk matrix is that it models the phosphor spectral emission characteristics which tend to exhibit long term stability, to an excellent approximation. Calibration using the entirety of this model does not make sense, because expensive colorimetry instrumentation is required to measure the phosphor characteristics and because of the instrument limitations of the preferred monochrome, achromatic sensor.

$$\begin{bmatrix} X \\ Y \\ Z \end{bmatrix} = \begin{bmatrix} X_{r\,max} & X_{g\,max} & X_{b\,max} \\ Y_{r\,max} & Y_{g\,max} & Y_{b\,max} \\ Z_{r\,max} & Z_{g\,max} & Z_{b\,max} \end{bmatrix} \begin{bmatrix} R \\ G \\ B \end{bmatrix} \quad (10)$$

The scaling constants for monitors are derived by a procedure that closely follows the procedure developed for scanners. Step one involves measuring the tristimulus values of the primaries by colorimetric measurement, using a colorimeter such as the Minolta CRT color analyzer CA-100 at one point on the tone scale, usually at full scale. Other points could be chosen as well since monitor devices theoretically demonstrate phosphor consistency (phosphor chromaticities do not vary with emission level), but measurements below full scale are typically questionable due to instrumentation limitations. Such limitations can be overcome by using the subtractive measurement technique described in the related application. Then, given that the measurements are related to the phosphor emissivity by a convolution as follows:

$$X = k\int [r(\lambda)+g(\lambda)+b(\lambda)]x(\lambda)d\lambda \quad (11)$$

$$Y = k\int [r(\lambda)+g(\lambda)+b(\lambda)]y(\lambda)d\lambda \quad (12)$$

$$Z = k\int [r(\lambda)+g(\lambda)+b(\lambda)]z(\lambda)d\lambda \quad (13)$$

where $r(\lambda)$, $g(\lambda)$, $b(\lambda)$ are phosphor power spectral densities, $x(\lambda), y(\lambda), z(\lambda)$ are the 1931 CIE Color Matching Functions and k is a normalizing constant defined by:

$$k = \frac{100}{\int [r(\lambda)+g(\lambda)+b(\lambda)]y(\lambda)d\lambda} \quad (14)$$

and that the target values to achieve a neutral gray scale are: $X_{D50}=k_1$, $Y_{D50}=k_2$ and $Z_{D50}=k_3$. Scaling factors can be found that such that:

$$X_{D50}=k\int[C_0 r(\lambda)+C_1 g(\lambda)+C_2 b(\lambda)]x(\lambda)d\lambda \quad (15)$$

$$Y_{D50}=k\int[C_0 r(\lambda)+C_1 g(\lambda)+C_2 b(\lambda)]y(\lambda)d\lambda \quad (16)$$

$$Z_{D50}=k\int[C_0 r(\lambda)+C_1 g(\lambda)+C_2 b(\lambda)]z(\lambda)d\lambda \quad (17)$$

where $C_0$, $C_1$ and $C_2$ are unnormalized scaling factors. Since we are dealing with relative colorimetry, these may be scaled by dividing each by the largest values of the triad using $A=C_0/max(C_0,C_1,C_2)$, $B=C_1/max(C_0,C_1,C_2)$ and $C=C_2/max(C_0,C_1,C_2)$ where A, B and C are normalized color balance constants. The constants are stored in the header file associated with each transform.

The above technique involves determining the scaling constants using a colorimeter as the calibration instrument. However, the scaling constants can be determined using the preferred achromatic sensors as discussed below.

A monitor is a linear additive device such that the white spectral power density is the sum of the three primary spectral densities $$w(\lambda) = r(\lambda)+b(\lambda)+g(\lambda) \quad (18)$$

When a colorimeter is used to measure a white patch on a monitor the results are found by convolving the color matching functions with the spectral power density of the patch to find normalized X, Y and Z using equations (11)–(14). This shows that the measurements made by a colorimeter, the X, Y and Z, values are integrals of the convolved curves. An achromatic measurement device, such as the preferred sensor, cannot generate the three values from a white patch measurement. The achromatic sensor can measure the response of each primary if the primary is displayed and measured independently. The three measurements are not related to the tristimulus values because the bandpass functions do not match those of the color matching functions. The measurements are calculated using a convolution as done for a colorimeter but the equations change to reflect the spectral "taking" characteristics of the achromatic sensor. The monitor primaries have an effective power spectral density of:

$$B = b(\lambda)f(\lambda) \quad (19)$$

$$G = g(\lambda)f(\lambda) \quad (20)$$

$$R = r(\lambda)f(\lambda) \quad (21)$$

where $f(\lambda)$ is the spectral response of the achromatic sensor.

Since the spectral characteristics differ between the two measurements a calibration of the colorimeter to the achromatic sensor must occur which results in unnormalized scaling factors.

To obtain the scaling constants we must know X, Y and Z and some function of $R(\lambda)$, $G(\lambda)$ and $B(\lambda)$ where $R(\lambda)$, $G(\lambda)$ and $B(\lambda)$ are the convolutions of phosphor power density functions; $r(\lambda)$, $g(\lambda)$ and $b(\lambda)$ and $f(\lambda)$ the achromatic spectral response of the sensor as given in equations (19)-(21). Integrating each sum in equations (15)-(17) gives:

$$X = kC_0 \int R(\lambda)x(\lambda)d\lambda + kC_1 \int G(\lambda)x(\lambda)d\lambda + kC_2 \int B(\lambda)x(\lambda)d\lambda \quad (22)$$

$$Y = kC_0 \int R(\lambda)y(\lambda)d\lambda + kC_1 \int B(\lambda)y(\lambda)d\lambda + kC_2 \int B(\lambda)y(\lambda)d\lambda \quad (23)$$

$$Z = kC_0 \int R(\lambda)z(\lambda)d\lambda + kC_1 \int G(\lambda)z(\lambda)d\lambda + kC_2 \int B(\lambda)z(\lambda)d\lambda \quad (24)$$

All of the variables of the integrations above are known for a monitor of a specific type and an achromatic measurement device, such as the preferred sensor. A single grey patch ($R=G=B=255$) can be selected to evaluate. Two evaluation procedures are available the first is a calculation method and the second is a measurement method.

In the first calculation procedure the first step is to calculate X, Y and Z for a white point ($R=G=B=255$) by substituting phosphor spectral densities and color matching functions into equations (11)-(13) so that the relative peak between $b(\lambda)$, $g(\lambda)$ and $r(\lambda)$ is preserved. Next the values for X, Y and Z are substituted into equations (22)-(24) and the integrals are calculated using the spectral densities of the phosphors, color matching functions and the achromatic sensor. Equations (22)-(24) are solved using conventional linear algebra methods and the constants $C_0$, $C_1$ and $C_2$ are normalized. These constants are then provided as part of the calibration package with the monitor.

The second method, at the factory, first measures, at the factory, the X, Y and Z for the white point ($R=G=B=255$) using the colorimeter previously mentioned and provides the values to the user as part of the calibration software. The values are substituted into equations (22)-(24). The response of the achromatic sensor is measured separately by the user using color patches for red ($R=255$), blue ($B=255$) and green ($G=255$). The results are substituted into equations (22)-(24). The value k is set at 1 and the constants are solved for as discussed previously. The constants $C_0$, $C_1$ and $C_2$ are then normalized and stored in the calibration software. In this method the achromatic sensor calibrated against the colorimeter on particular display type allowing the achromatic sensor to be used on all displays of the same type. That is, the user measures red, blue and green patches and the software does the calculations discussed above using the X, Y and Z values loaded into the equations at the factory. Of course the user could measure the X, Y and Z values if desired when the monitor is purchased and load the values into the software.

Figure 15:
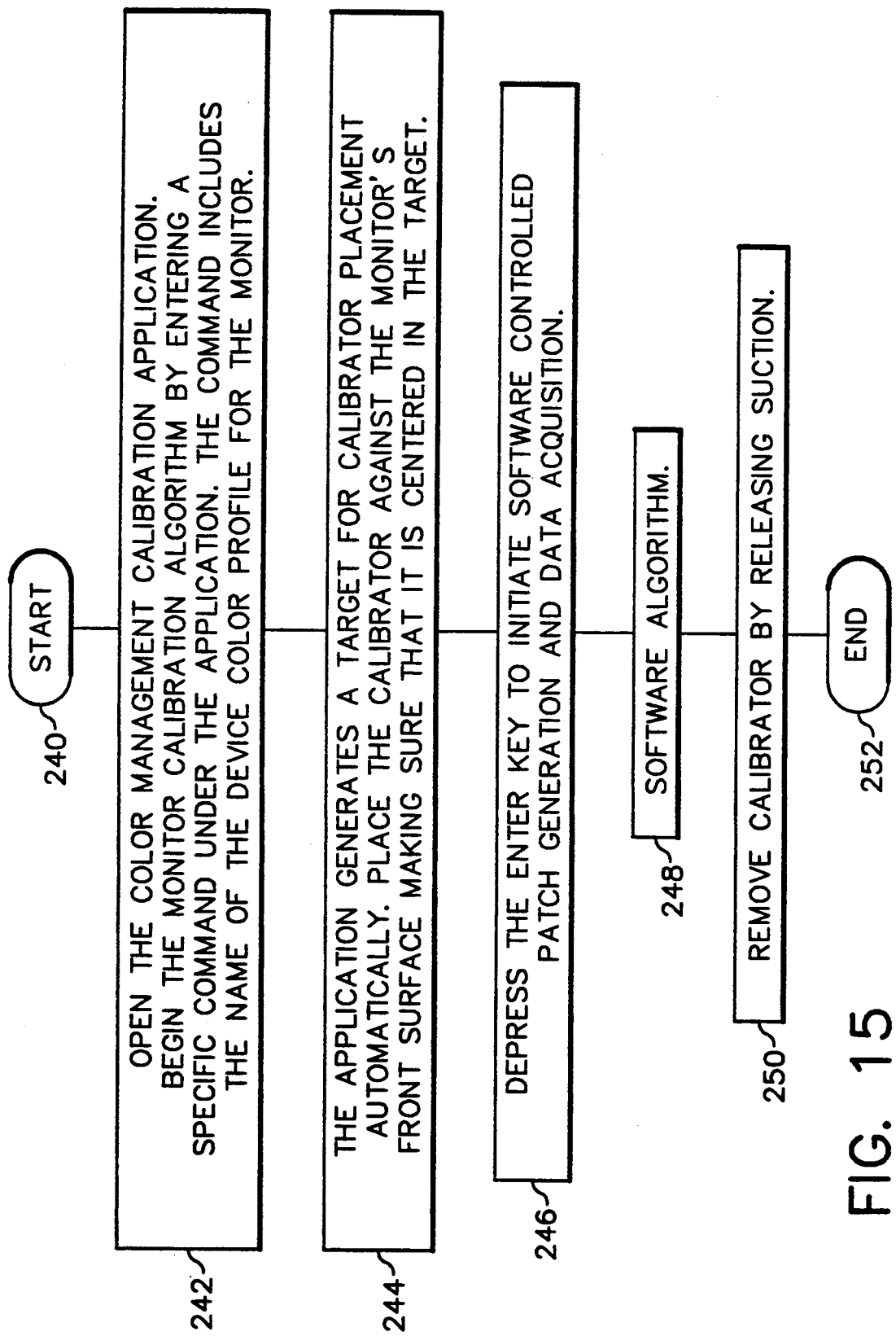
FIG. 15 is a flowchart of a monitor calibration procedure.

The monitor calibration procedure, as illustrated in FIG. 15, begins by opening 242 the color management calibration application followed by the selection of the monitor calibration routine under the application. This routine requires the naming of the appropriate device color profile (file name) for the monitor to be calibrated.

A circular target for calibrator placement is displayed 244 on the monitor after the file is successfully found. The user is instructed, via a monitor displayed prompt, to place the calibrator unit 70 in the center of the circular target and press the unit 70 firmly against the CRT tube face. A built-in suction cup on the calibrator unit creates sufficient vacuum to hold the measurement device against the tube face for the duration of the measurement. The user is also instructed to press a specific key to initiate 246 software controlled patch generation and data acquisition and calibration 248, discussed in more detail with respect to FIGS. 16A and 16B and then the calibrator unit 70 is removed 250.

Figure 16A:
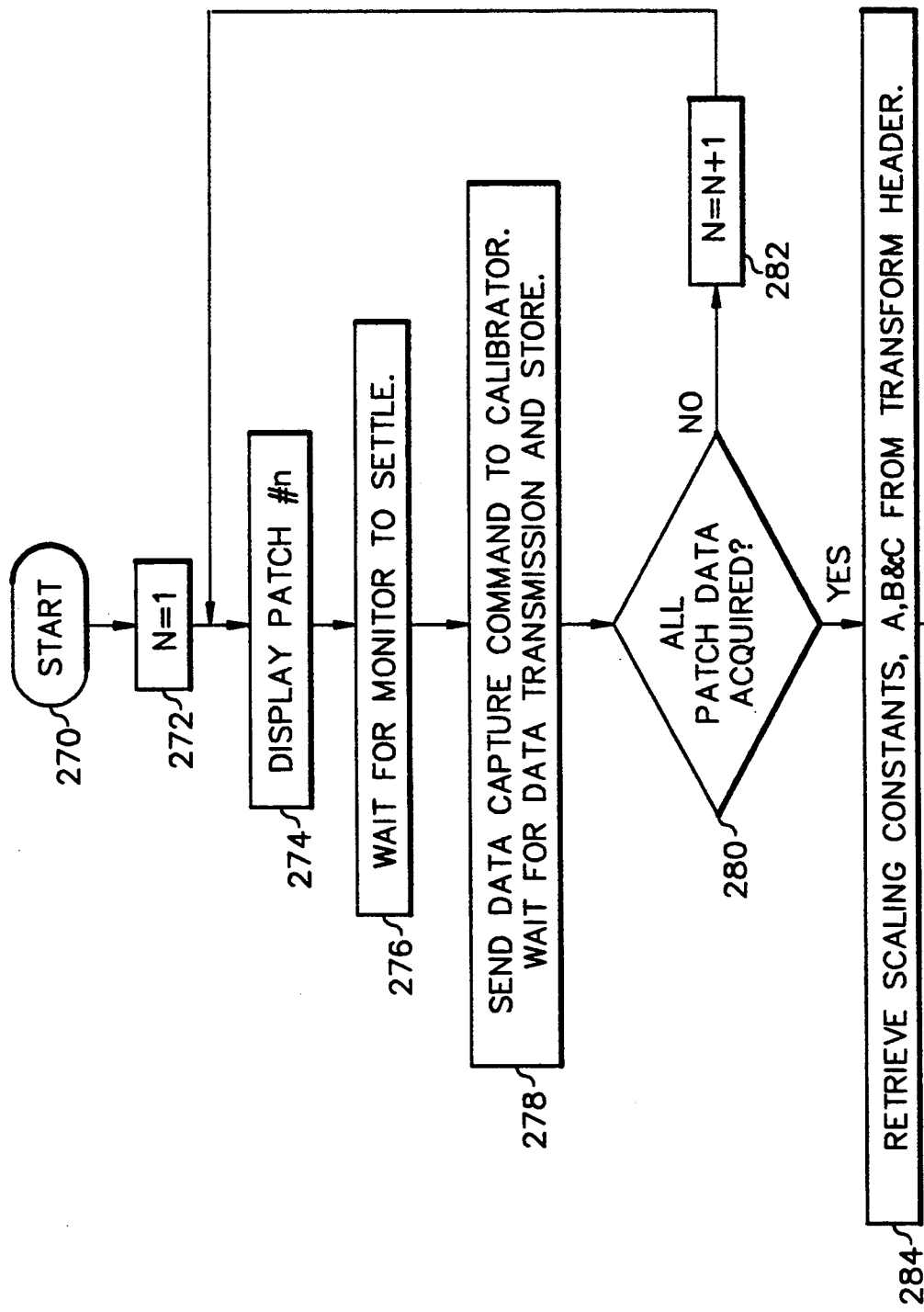

In the calibration operation of FIGS. 16A, 16B and 16C a sequence of color targets are conventionally generated and displayed which allows the calibrator unit 70 to measure each gun's "gamma" curve and the combined gray curve. The measurement sequence requires measurement of a red curve from 0 to maximum input value, for example at every other value, measurement of the green curve, measurement of the blue curve and measurement of a combined curve where R, G and B input values are equal. A patch counter is initialized 272 (FIG. 16A) where the patch counter corresponds to the intensity of the color being measured. Each target is first rendered 274 in video memory which automatically causes it to be displayed 274 on the monitor. A wait period for monitor settling on the order of several refresh fields is provided 276 and then the calibrator is commanded 278 to capture data and transmit the results to the computer 60. Each target preferably has a near 50% gray background containing a central circular patch whose monochrome or color intensities are varied in accordance with a predefined sequence. This sequence generates a conventional gamma curve whose quantization is equally spaced in device RGB space by providing different intensity monitor drive values (counts) for each patch which is measured by the unit 70 for the corresponding light intensity output for the input drive value. Experience has shown that a minimum of three values are required if each curve is to be modeled using the idealized relationship in equations (7)-(9) during correction table generation, while approximately 32 are required if the data points are to utilized in an interpolation procedure. A complete scale of 0-255 points can be taken if desired which gives the best results if the instrumentation is capable of recording low luminance data accurately, a reason the subtractive technique of the related application is preferred. A partial scale created by measuring for every other code value is a compromise between speed and accuracy.

Once all the data is captured based on a data test (280) and patch number incrementation (282), the scaling constants are then retrieved 284 from the transform selected by the user. All constants are located in the header file.

Figure 17:
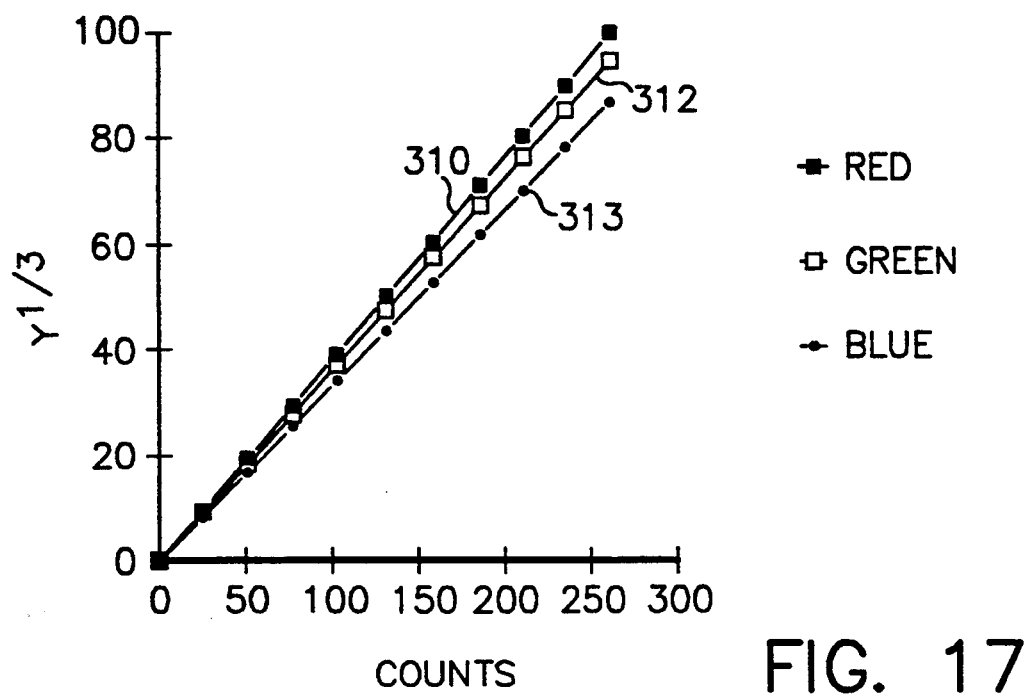
FIG. 17 depicts balanced aim curves for a monitor.
Figure 18:
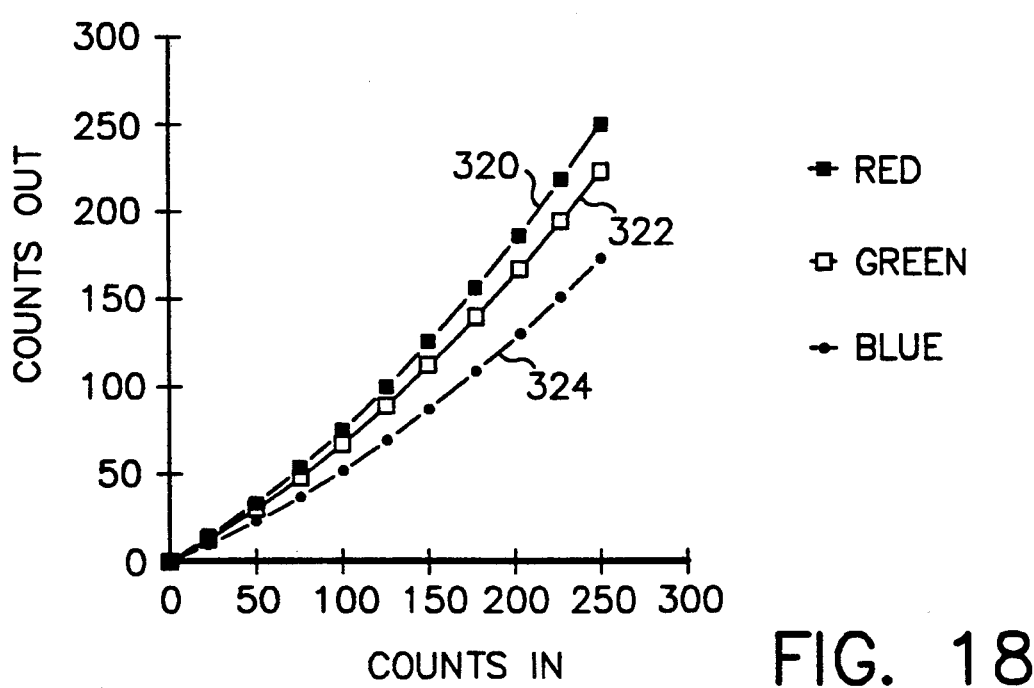
FIG. 18 depicts in graphic form a correction table for a monitor.

Generation of the attenuation factors discussed previously, D50 balanced aim curves and the correction tables follow the procedure discussed previously for scanners, thus steps 286-294 (FIG. 16B) will not be discussed in detail. There are some important differences, however, that must be discussed. The first and foremost is the choice of "linearization space". As discussed previously, the gamma curves are measured using a photometric (light intensity measurement) device and the results are numerically altered via a cubic root function as discussed with respect to steps 152-162 of FIG. 11. This post processing is specifically instituted to minimize system errors when the calibration tables are cascaded with the characterization transform during color correction calibration. Other spaces could have been chosen without loss of generality. This choice does influence the balanced aim curves generated as illustrated in FIG. 17 because the vertical scales change. The correction tables produced as depicted graphically in FIG. 18 also change shape if a different space is chosen.

Applying the present invention to printers can become complicated due to the inherent nonadditive response of such devices. Prediction of color balance corrections to achieve a true neutral across a gray step wedge generally requires that the balance parameters be recalculated at each data point for the highest possible accuracy. Since the goal is to simply return the device to a known operating condition, true gray scale preservation is not required and the color balance calculations may be performed at one point. This first order approximation is subsequently corrected by the characterization process.

This printer device class usually does not lend itself to precise analytical modeling which does not permit concise justification of the calibration process. Most printers, especially the ink and wax transfer devices, are best modeled utilizing a polynomial approach, since ink lay down characteristics are complicated to model. If the assumption is made that the ink's or dye's relative spectral characteristics vary only slightly and that the absolute lay down shows a high degree of variance between print engines and media/ink batches, then constrained channel independent calibration is possible. These assumptions are not 100% accurate, but experience has indicated that the assumptions are a very good approximation to real world anomalies.

Figure 19:
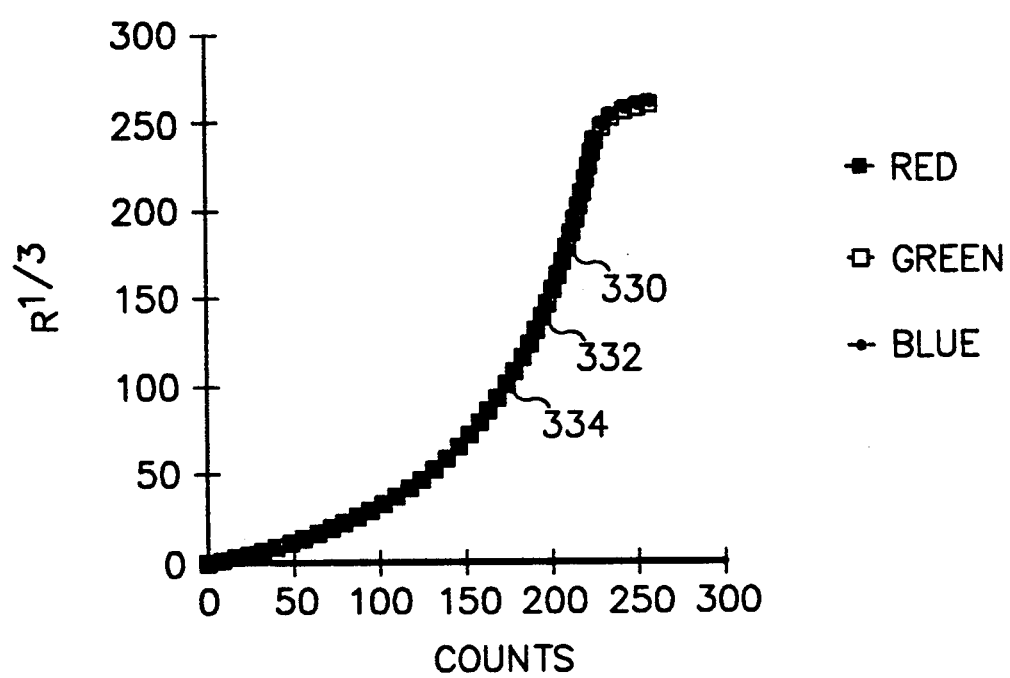
FIG. 19 illustrates a typical printer response.

The tone curves for a typical dye sublimation printer are reproduced in FIG. 19. Note that all three colorants 330, 332, 334 appear to track as expected (required to achieve a gray scale) and that the three scales saturate near 100% RGB reflectance (or equivalently, near 0% CMY reflectance). Scaling the tone scale responses at one point is sufficient to achieve the desired color balance to a first order approximation. Channel saturation effects shown here do affect choice of balance point—obviously maximum scale is not appropriate. A midscale data point yields a good result. Given that only a single point is utilized, these saturation effects will not be compensated for and hue shift will occur. Fortunately, saturation occurs in the black region where the eye is not hue sensitive, so the effect may be ignored with little impact on overall image quality.

Assuming a single balance point near midtone scale, the scaling constants are derived as follows. The CMY printer's (or RGB printer's) tristimulus response can be simply modeled to a first order approximation as:

$$X = k\int [r(\lambda)+g(\lambda)+b(\lambda)]x(\lambda)p(\lambda)P(\lambda)d\lambda \quad (25)$$

$$Y = k\int [r(\lambda)+g(\lambda)+b(\lambda)]y(\lambda)p(\lambda)P(\lambda)d\lambda \quad (26)$$

$$Z = k\int [r(\lambda)+g(\lambda)+b(\lambda)]z(\lambda)p(\lambda)P(\lambda)d\lambda \quad (27)$$

where $r(\lambda)$, $g(\lambda)$, $b(\lambda)$ are printed patch spectral reflection densities associated with RGB channels, $x(\lambda)$, $y(\lambda)$, $z(\lambda)$ are the 1931 CIE Color Matching Functions, $p(\lambda)$ is the viewing source spectral power distribution preferably D50, $P(\lambda)$ is measurement device spectral response, and k is a normalizing constant defined by:

$$k = \frac{100}{\int [r(\lambda)+g(\lambda)+b(\lambda)]y(\lambda)p(\lambda)P(\lambda)d\lambda} \quad (28)$$

and that the target values to achieve a neutral gray scale are the paper white tristimulus under D50:

$$X_{D50}=k_1, \; Y_{D50}=k_2 \text{ and } Z_{D50}=k_3.$$

Scaling factors can be found such that:

$$X_{D50} = k\int [C_0 r(\lambda)+C_1 g(\lambda)+C_2 b(\lambda)]x(\lambda)d\lambda \quad (29)$$

$$Y_{D50} = k\int [C_0 r(\lambda)+C_1 g(\lambda)+C_2 b(\lambda)]y(\lambda)d\lambda \quad (30)$$

$$Z_{D50} = k\int [C_0 r(\lambda)+c_1 g(\lambda)+C_2 b(\lambda)]z(\lambda)d\lambda \quad (31)$$

where $C_0$, $C_1$ and $C_2$ are unnormalized scaling factors. Since we are dealing with relative colorimetry, these may be scaled by dividing each by the largest values of the triad using: $A=C_0/\max(C_0,C_1,C_2)$, $B=C_1/\max(C_0,C_1,C_2)$ and $C=C_2/\max(C_0,C_1,C_2)$ where A, B and C are normalized color balanced scaling constants.

Figure 20B:
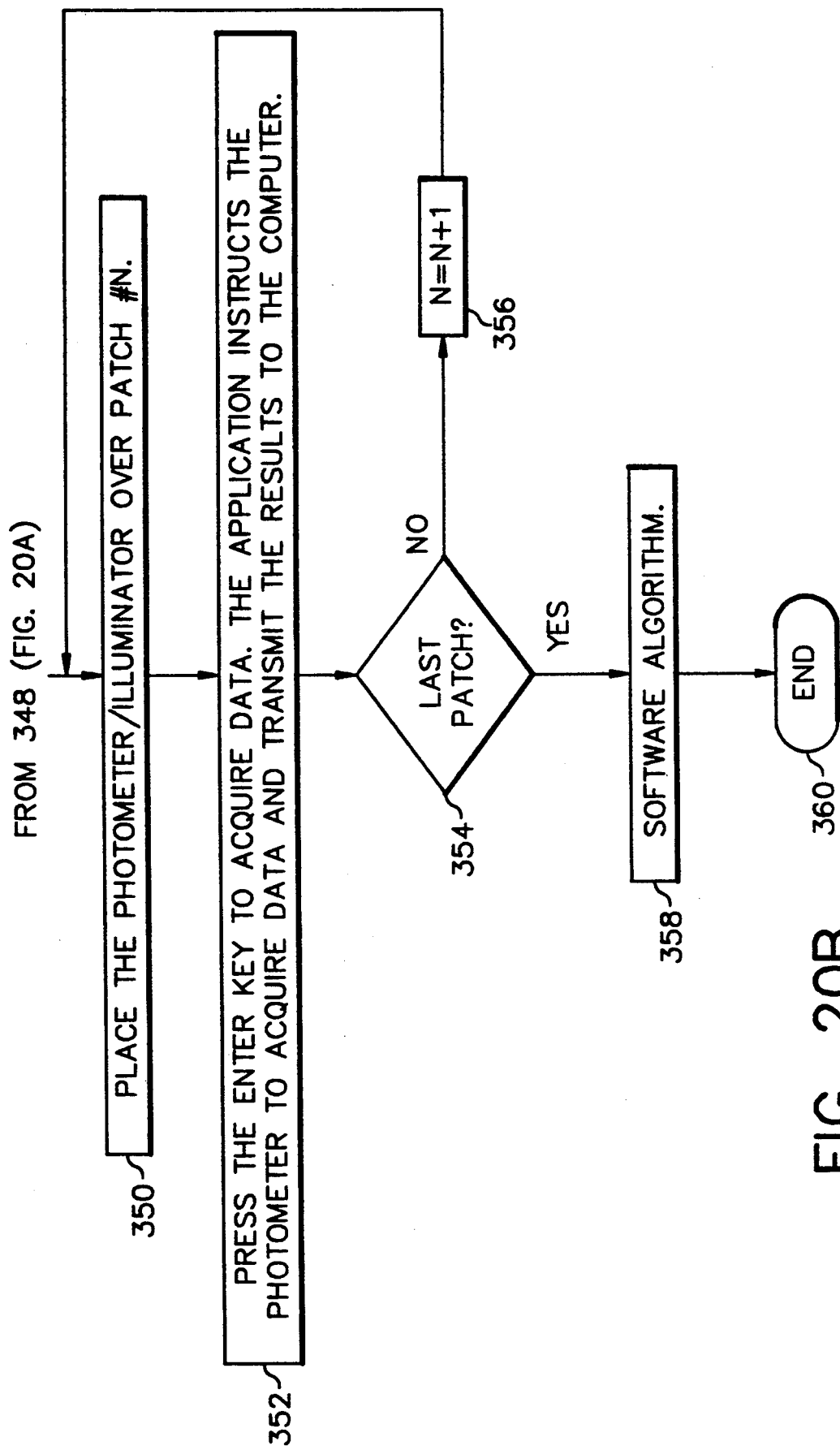

The printer calibration procedure is illustrated in FIGS. 20A and 20B. Commercial spectrophotometers or densitometers may be used for tone scale measurement, but are extremely high in cost. The approach preferred involves using the monitor calibrator unit 70 with a stable illuminator 72 to enable measurement of relative reflectances.

The calibration procedure begins by opening 342 (FIG. 20A) the color management calibration application followed by the selection of the printer calibration routine under the application. This routine requires the naming of the appropriate device color profile file for the printer to be calibrated.

The gray scale target is rendered 344 in memory and the resulting bit-map is down loaded to the printer. A high level graphics language could be utilized instead, but some printers do not contain the Raster Image Processors (RIPs) required to render the image in the printer. The target is identical to the gray scale target in FIG. 8 except that it exists as an electronic file.

The user then presses a key to initiate 346 a software controlled data acquisition. A patch counter is initialized 348 and the count value corresponds to the intensity of a particular color curve being measured. Interactive responses should be used to synchronize measurements with the appropriate patch number. The user must place 350 (FIG. 20B) the reflectance measurement device over each patch in succession and press 352 a key to indicate set-up readiness. The application instructs the unit 70 to acquire reflectance data and return the results to the computer 60. Patch measurement order is unique and specific for this target so no deviation is permitted. User prompts on the monitor provide "next patch" information to prevent sequential measurement errors until a test 354 indicates that all patches have been measured. Otherwise the patch pointer is incremented 356. Once the density of all the patches for all the colors have been measured the calibration routine of FIG. 21 is performed 358.

Figure 21:
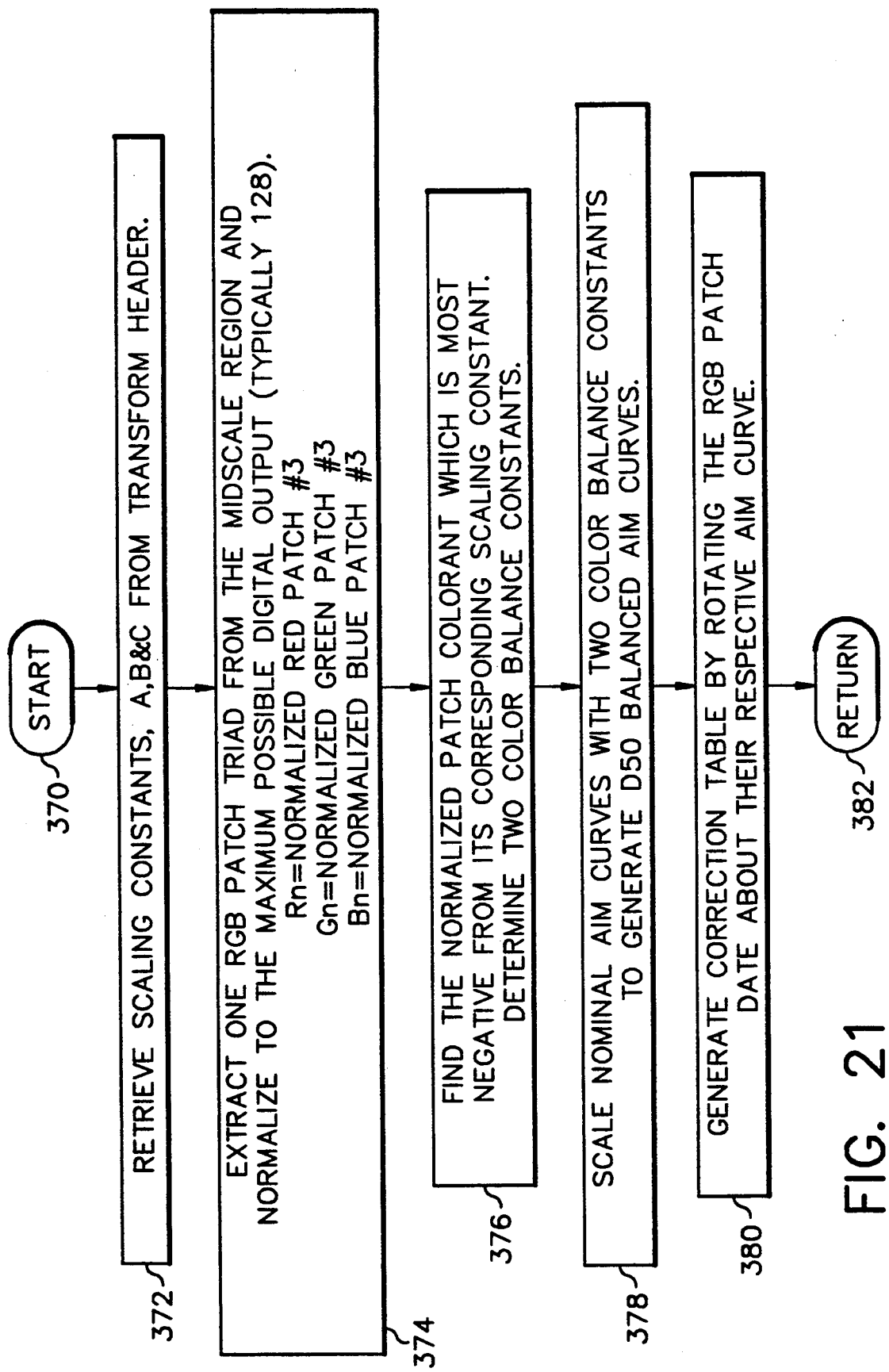
FIG. 21 is flowchart of a printer calibration process performed by a computer.
Figure 22:
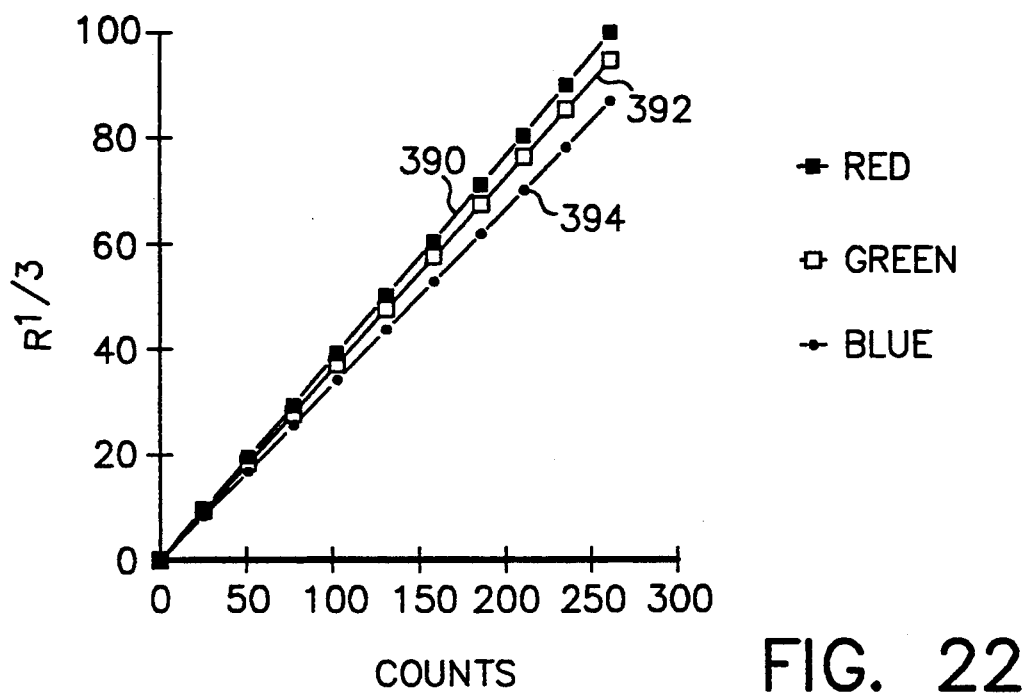
FIG. 22 illustrates balanced aim curves for a printer.
Figure 23:
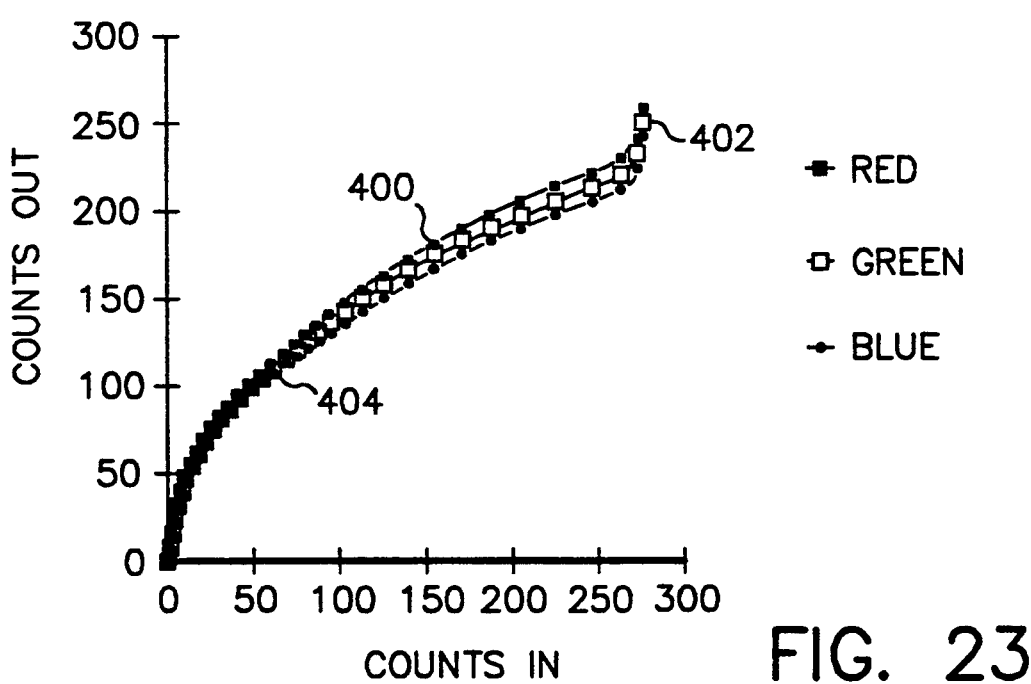
FIG. 23 is a correction table in graphic form for a printer.

Generation of the attenuation factors, D50 balanced aim curves and the correction tables follows the procedure previously discussed for scanners, thus steps 370–382 of FIG. 21 will not be discussed in detail. There are some important differences; however, that must be discussed. The first and foremost is the choice of "linearization space". As discussed previously, the tones are measured using a photometric device and a light source, and the results are numerically altered via a cubic root of reflection function. This post processing is specifically instituted to minimize system errors when the calibration tables are cascaded with the characterization transform. Other spaces could have been chosen without loss of generality. This choice does influence the balanced aim curves generated and illustrated in FIG. 22. The correction table shapes are also affected, the results for this example are given in FIG. 23.

Once the particular combined characterization, balanced aim calibration correction, scaling correction and saturation correction table has been created for a particular device, such as the printer 68, monitor 66 or scanner 62 of FIG. 6, the table is stored in a file in the nonvolatile storage of the computer 60, such as the hard disk. When a particular operation needing the transform is required the table is loaded and used. For example, if a document to be scanned is loaded into the scanner, as the pixel input values are received from the scanner the scanner table is used, in a conventional table lookup operation, to convert the pixel values to pixel values in the color space desired for further processing. Once the processing of the image is complete as the pixels for output are sent to the monitor memory or the printer memory for display or printing the pixels are transformed using the appropriate monitor and/or printer tables. As a result, the scanned, displayed and printed image will visually appear identical.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of calibrating a desk top computer color device, comprising the steps of:
   (a) controlling, upon initiation of a user, the color device to produce three color characterization curves of a tricolor response of the color device; and
   (b) adaptively producing three color balanced calibration tables from the characterization curves, comprising the steps of:
   (b1) determining scaling constants;
   (b2) normalizing the characterization curves for a maximum device dynamic range compensating for saturation;
   (b3) determining a most negative normalized response;
   (b4) determining color balance constants from the most negative normalized response;
   (b5) scaling aim curves using the color balance constants; and
   (b6) creating the calibration tables using the scaled aim curves and the normalized characterization curves.

2. A method of calibrating a desk top computer color device, comprising the steps of:
   (a) controlling the color device to produce color characterization curves of a color response of the device; and
   (b) adaptively producing color balanced calibration tables from the characterization curves, step (b) comprising:
   (b1) determining scaling constants;
   (b2) normalizing the characterization curves for a maximum device dynamic range compensating for saturation;
   (b3) determining a most negative normalized response;
   (b4) determining color balance constants from the most negative normalized response;
   (b5) scaling aim curves using the color balance constants; and
   (b6) creating the calibration tables using the scaled aim curves and the normalized characterization curves.

3. A method of calibrating a desk top computer color device, comprising the steps of:
   (a) controlling the color device to produce color transfer characterization curves of a color response of the device; and
   (b) adaptively producing white point color balanced calibration tables from the characterization curves.

4. A method as recited in claim 3, wherein said method is initiated by a user of the desk top computer.

5. A method as recited in claim 3, wherein said characterization curves of step (a) are first, second and third different color curves.

6. A method as recited in claim 3, wherein step (b) comprises producing the white point color balanced calibration tables using a color balanced tricolor aim curve.

7. A method as recited in claim 3, wherein step (a) includes producing an RMS average for a group of pixels for each point on the characterization curves.

8. A method of creating one dimensional color calibration tables from response characterization values produced by a color input/output device, comprising the steps of:
   (a) normalizing the characterization values;
   (b) determining white point color balanced aim curves from the characterization values; and
   (c) producing the color calibration tables using the balanced aim curves and the characterization values.

9. A method as recited in claim 8, further comprising (d) compensating for saturated channel response by scaling the balanced aim curves to preserve white point color balance.

10. A method as recited in claim 8, wherein the balanced aim curves are linear.

11. A method as recited in claim 8, wherein the balanced aim curves are nonlinear.

12. An apparatus for color device calibration, comprising:
   intensity measurement means for separately measuring intensity characterization curves of color channels of the color device; and
   calibration means for creating calibration curves for producing a white point balanced response by the color device responsive to the characterization curves, said calibration means comprising:
   constant means for determining normalized color balanced scaling constants;
   normalization means for normalizing the characterization curves to a maximum response;
   balance constant means for determining curve balance constants using the scaling constants;

balance curve scaling means for scaling aim curves with the curve balance constants; and balanced curve creation means for creating correction tables by transforming the characterization curves using the scaled aim curves.

13. An apparatus for calibrating a color device, the color device comprising a monitor, printer and scanner, the apparatus comprising:

an achromatic light sensor separately and achromatically measuring intensity characterization curves of color channels of the color device; and a computer creating calibration curves for producing a white point balanced response by the color device responsive to the characterization curves, said computer comprising:

constant means for determining normalized color balanced scaling constants;

normalization means for normalizing the characterization curves to a maximum response;

balance constant means for determining curve balance constants using the scaling constants;

balance curve scaling means for scaling aim curves with the curve balance constants; and balanced curve creation means for creating correction tables by transforming the characterization curves using the scaled aim curves.

14. An apparatus for color device calibration, comprising:

intensity measurement means for separately measuring intensity characterization curves of color channels of the color device; and calibration means for creating calibration curves for producing a white point balanced response by the color device responsive to the characterization curves and normalizing to a characterization curve having a most negative maximum response when compared to a corresponding aim curve.

15. An apparatus for color device calibration, comprising:

intensity measurement means for separately measuring intensity characterization curves of color channels of the color device, said intensity means comprising an achromatic light sensor; and calibration means for creating calibration curves for producing a white point balanced response by the color device responsive to the characterization curves.

16. An apparatus for color device calibration, comprising:

intensity measurement means for separately measuring intensity transfer characterization curves of color channels of the color device; and calibration means for creating calibration curves for producing a white point balanced response by the color device responsive to the characterization curves.

17. An apparatus as recited in claim 16, wherein said calibration means creates said calibration curves by transforming the characterization curves using linear aim curves having a balanced white point.

18. An apparatus as recited in claim 16, wherein said calibration means scales the calibration curves to a saturation value.

19. An apparatus as recited in claim 16, wherein said color device comprises a monitor, a printer and a scanner.

20. An apparatus as recited in claim 16, wherein said calibration means comprises a computer.

* * * * *